(12) United States Patent
Fu et al.

(10) Patent No.: US 10,554,977 B2
(45) Date of Patent: Feb. 4, 2020

(54) METHOD AND SYSTEM OF HIGH THROUGHPUT ARITHMETIC ENTROPY CODING FOR VIDEO CODING

(71) Applicant: INTEL CORPORATION, Santa Clara, CA (US)

(72) Inventors: Fangwen Fu, Folsom, CA (US); Iole Moccagatta, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 63 days.

(21) Appl. No.: 15/859,100

(22) Filed: Dec. 29, 2017

(65) Prior Publication Data

US 2018/0234681 A1    Aug. 16, 2018

Related U.S. Application Data

(60) Provisional application No. 62/457,714, filed on Feb. 10, 2017.

(51) Int. Cl.
*H04N 19/13*  (2014.01)
*H04N 19/176* (2014.01)
*H04N 19/182* (2014.01)

(52) U.S. Cl.
CPC ........... *H04N 19/13* (2014.11); *H04N 19/176* (2014.11); *H04N 19/182* (2014.11)

(58) Field of Classification Search
None
See application file for complete search history.

(56) References Cited

U.S. PATENT DOCUMENTS

| | | | |
|---|---|---|---|
| 9,628,819 B2* | 4/2017 | Boisson | H04N 19/105 |
| 2003/0138158 A1* | 7/2003 | Schwartz | G06F 17/148 |
| | | | 382/240 |
| 2010/0040138 A1* | 2/2010 | Marpe | H04N 19/176 |
| | | | 375/240.02 |
| 2011/0200104 A1* | 8/2011 | Korodi | H03M 7/40 |
| | | | 375/240.12 |
| 2012/0014433 A1* | 1/2012 | Karczewicz | H03M 7/40 |
| | | | 375/240.02 |
| 2012/0014454 A1* | 1/2012 | Budagavi | H04N 19/91 |
| | | | 375/240.16 |
| 2012/0081241 A1* | 4/2012 | Misra | H03M 7/4093 |
| | | | 341/107 |
| 2012/0081242 A1* | 4/2012 | He | H03M 7/40 |
| | | | 341/107 |
| 2012/0082215 A1* | 4/2012 | Sze | H04N 19/13 |
| | | | 375/240.03 |
| 2012/0114039 A1* | 5/2012 | Wang | H04N 19/197 |
| | | | 375/240.13 |
| 2012/0121011 A1* | 5/2012 | Coban | H04N 19/176 |
| | | | 375/240.03 |

(Continued)

OTHER PUBLICATIONS

Sze, Vivienne et al., "A comparison of cabac throughput for HEVC/H.265 Vs. AVC/H.264", IEEE Workshop on Signal Processing Systems; pp. 165-170; 2013.

*Primary Examiner* — Mohammad J Rahman
(74) *Attorney, Agent, or Firm* — Green, Howard & Mughal LLP.

(57) ABSTRACT

A method, system, and articles of high throughput arithmetic entropy coding for video coding uses a non-framewidth raster order or non-raster order to form spatial neighbor probability contexts for entropy coding.

22 Claims, 14 Drawing Sheets

(56) References Cited

U.S. PATENT DOCUMENTS

| | | | |
|---|---|---|---|
| 2012/0328026 A1* | 12/2012 | Sole Rojals | H03M 7/6023 375/240.18 |
| 2013/0058407 A1* | 3/2013 | Sole Rojals | H04N 19/13 375/240.12 |
| 2014/0105293 A1* | 4/2014 | George | H03M 7/3071 375/240.12 |
| 2016/0337667 A1* | 11/2016 | Nagaoka | H04N 19/91 |
| 2017/0013268 A1* | 1/2017 | Kim | H04N 19/61 |
| 2017/0013269 A1* | 1/2017 | Kim | H04N 19/436 |

* cited by examiner

```
┌─────────────────────────────────────────────────────────────┐
│ OBTAIN A PLURALITY OF FRAMES OF A VIDEO SEQUENCE, WHEREIN   │
│ INDIVIDUAL FRAMES ARE FORMED OF DATA FROM ROWS OF PIXELS 602│
└─────────────────────────────────────────────────────────────┘
                              ▼
┌─────────────────────────────────────────────────────────────┐
│ DETERMINE A SPATIAL NEIGHBOR PROBABILITY CONTEXT TO BE USED │
│ TO ARITHMETICALLY CODE DATA OF A CURRENT PIXEL LOCATION ON AT│
│   LEAST ONE OF THE FRAMES AND COMPRISING ENTROPY CODING     │
│  SPATIAL NEIGHBOR PIXELS IN AN ORDER TO ENTROPY CODE THE DATA│
│  OF THE CURRENT PIXEL LOCATION BEFORE CODING SUBSTANTIALLY  │
│ ALL OR ALL OF THE PIXEL LOCATIONS IN A ROW OF PIXELS ABOVE AND│
│ ADJACENT THE ROW OF PIXELS HAVING THE CURRENT PIXEL LOCATION,│
│  WHEREIN THE ROWS EXTEND ACROSS AN ENTIRE IMAGE FORMING THE │
│                         FRAME  604                          │
└─────────────────────────────────────────────────────────────┘
                              ▼
┌─────────────────────────────────────────────────────────────┐
│       USE THE SPATIAL NEIGHBOR PROBABILITY CONTEXT TO       │
│     PERFORM ARITHMETIC ENTROPY ENCODING OR DECODING         │
│      OF THE DATA OF THE CURRENT PIXEL LOCATION  606         │
└─────────────────────────────────────────────────────────────┘
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  PERFORM THE ENTROPY CODING OF MULTIPLE CURRENT PIXEL       │
│  LOCATIONS IN PARALLEL ON MULTIPLE DIFFERENT ROWS OF THE    │
│                      SAME FRAME  608                        │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│       DIVIDE THE AT LEAST ONE FRAME INTO ENTROPY            │
│  BLOCKS OF A PLURALITY OF PIXELS THAT IS LESS THAN          │
│                 THE ENTIRE FRAME  610                       │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                              ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│     ENTROPY CODE ONE OR MORE CURRENT PIXEL                  │
│     LOCATIONS IN INDIVIDUAL ENTROPY BLOCKS IN               │
│  PARALLEL TO THE CODING OF PIXEL LOCATIONS IN               │
│            OTHER ENTROPY BLOCKS  612                        │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
```

Ctx of D: B
Ctx of C: A, B

Ctx of F: D
Ctx of E: C, A, B, D

Ctx of G: C, E
Ctx of H: E, B, D, F
Ctx of I: F

Ctx of L: G, C, E, H
Ctx of M: H, D, F, I
Ctx of N: I

Ctx of O: G, L
Ctx of P: L, E, H, M
Ctx of Q: M, F, I, N
Ctx of R: N

Ctx of B: A
Ctx of C: A

Ctx of D: B
Ctx of E: A, B, C
Ctx of F: C

Ctx of G: D
Ctx of H: D, B, E
Ctx of I: E, C, F
Ctx of L: F

Ctx of M: G
Ctx of N: G, D, H
Ctx of O: H, E, I
Ctx of P: I, F, L
Ctx of Q: L

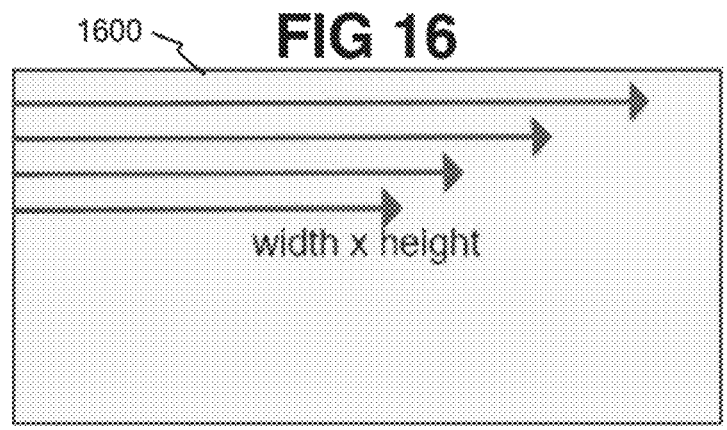
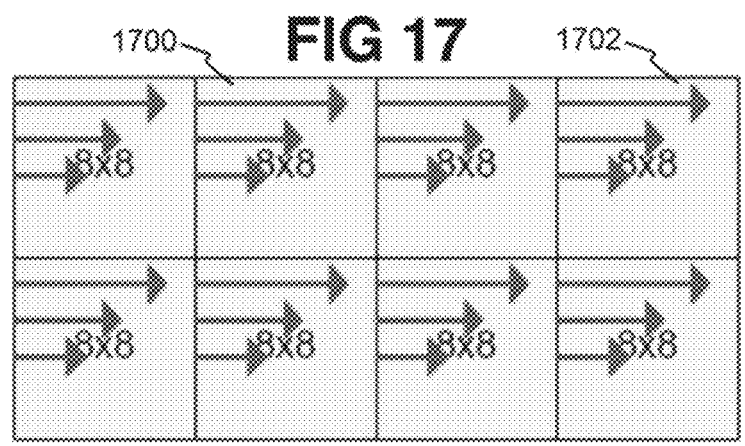
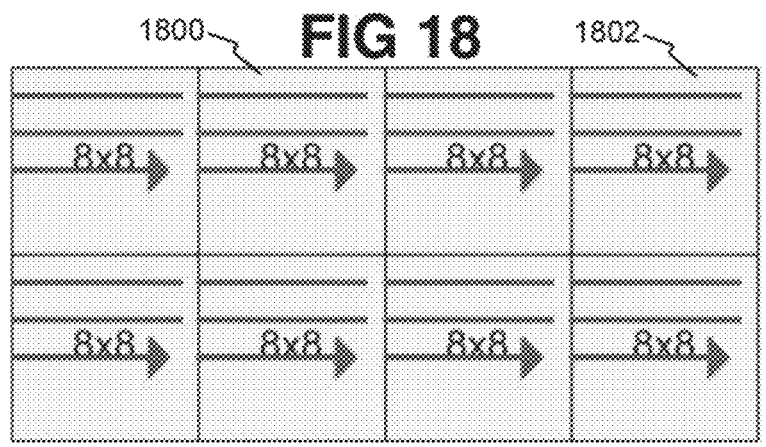

US 10,554,977 B2

METHOD AND SYSTEM OF HIGH THROUGHPUT ARITHMETIC ENTROPY CODING FOR VIDEO CODING

CROSS-REFERENCE TO RELATED APPLICATION

This application claims the benefit of U.S. Provisional Patent Application No. 62/457,714, filed on Feb. 10, 2017 and titled METHOD AND SYSTEM OF HIGH THROUGHPUT ARITHMETIC ENTROPY CODING FOR VIDEO CODING, which is incorporated fully herein for all purposes.

BACKGROUND

Due to ever increasing video resolutions, and rising expectations for high quality video images, a high demand exists for efficient image data compression of video while performance is limited for coding with existing video coding standards such as VP9, Alliance Open Media Version 1 (AV1), H.264, H.265/HEVC (High Efficiency Video Coding) standard, and so forth. The aforementioned standards use expanded forms of traditional approaches to address the insufficient compression/quality problem, but often the results are still insufficient.

Conventional video codec encodes or decodes frames of a video sequence where each frame is formed of pixel data, and the codec performs a number of operations including both lossy and lossless compression and decompression. Relevant here, the lossless compression and decompression may include entropy coding that replaces a large number of bits of one or more symbols with one bit or at least a much smaller number of bits. In arithmetic entropy coding methods, a probability context is determined to compute the probabilities that a bit will be a certain symbol among a set of possible symbols (such as all alpha-numeric symbols). These probabilities are then used to determine a binary or other value to represent one or more of the bits. The probability context for a current pixel location may be determined, at least in part, by the data of the spacial neighbor pixels adjacent to the current pixel location. This results in the decoding of the current location to be delayed until the data of those spacial neighbors are decoded, which is usually performed row by row down a frame (or picture) in raster order. This causes significant delay and lower throughput in the form of a lower bitrate.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 6 is a flow chart of a method of high throughput arithmetic entropy coding for video coding according to the implementations herein;

FIG. 16 is a schematic diagram of a video frame showing raster order progression of processing for arithmetic entropy coding;

FIG. 17 is a schematic diagram of a video frame showing block-based non-raster order parallel progression of processing for arithmetic entropy coding according to the implementations herein;

FIG. 18 is a schematic diagram of a video frame showing block-based raster-order parallel progression of processing for arithmetic entropy coding according to the implementations herein;

DETAILED DESCRIPTION

Figure 1:
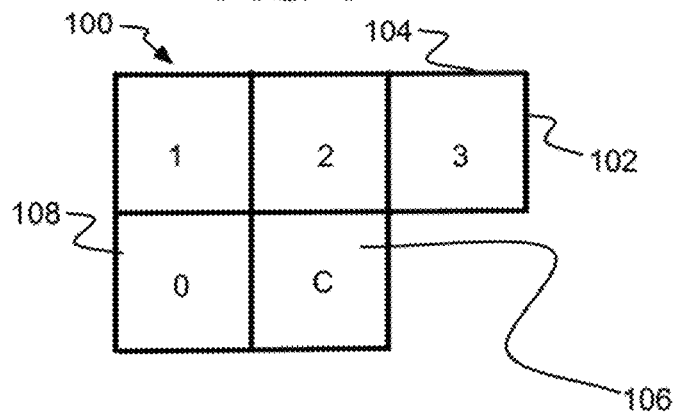
FIG. 1 is a schematic diagram of a pixel arrangement used for providing a probability context for arithmetic entropy coding.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to video coding with context decoding and reconstruction bypass.

There are many different types of arithmetic entropy coding including context-adaptive variable length coding (CAVLC) and context-adaptive binary arithmetic coding (CABAC), but other examples exist whether or not it is considered a binary-based entropy method. For the example here. CABAC may be used and involves three main steps:

(1) Symbol Binarization: Syntax elements formed of multiple bits, such as a motion vector distance, coefficient value, or even the chroma or luma pixel values themselves, are mapped to binary symbols (or bins) using a binarization process. In other words, this operation breaks down a word of multiple bits into single bits or groups of bits that can be compressed. Various forms of binarization are used in AVC and HEVC (e.g. Exp-Golomb, fixed length, truncated unary, custom), and VP# codecs.

(2) Arithmetic Coding: The bins are compressed into bits using arithmetic coding (i.e. multiple bins can be represented by a single bit); this allows syntax elements to be represented by a fractional number of bits, which improves coding efficiency. Arithmetic coding involves recursive sub-interval division, where a range is divided into two subintervals based on the probability of the symbol that is being compressed. The encoded bits represent an offset that, when converted to a binary fraction, selects one of the two subintervals, which indicates the value of the decoded bin. After every decoded bin, the range is updated to equal the selected subinterval, and the interval division process repeats itself. In order to effectively compress the bins to bits, the probability of the bins must be accurately estimated.

(3) Context Selection: The context modeling and selection is used to accurately model the probability of each bin. The probability of the bin depends on the type of syntax element it belongs to, the bin index within the syntax element (e.g. most significant bin or least significant bin), and the properties and data of spatially neighboring pixels or in other words, the spatial probability context. There are several hundred different context models used in AVC, VP9, and HEVC. As a result, in some codecs, a large finite state machine is needed to select the correct context for each bin when multiple different contexts are available. In addition, the estimated probability of the selected context model is updated after each binary symbol is encoded or decoded.

Continuing with the example of a decoder, the probability model context(s) must be computed by the arithmetic decoder in order to decode other pixels. Because of the nature of the arithmetic decoding process, the decoding of the bits of a second pixel location cannot proceed until the bits of one or more other pixel locations are decoded by the arithmetic decoder. In other words, the arithmetic decoding process is a sequential process.

Specifically, in conventional arithmetic decoders, a probability model context is computed using information from pixels neighboring to a pixel location currently being decoded. Because of the spatial correlation between pixels in an area or portion (or referred to herein as a sample) of an image of a video sequence, the neighboring pixels used to compute the probability model context for a current pixel that needs to be decoded next are pixels that have been already decoded and that are spatially close to the current pixel. It should be noted that the terms image, frame, and picture are used interchangeably herein.

Referring to FIG. 1, a small part 102 of a frame 100 is shown with pixels "0" (108), "1", "2", and "3" (104) that are used to compute the probability model context (ctx for short) and of the "Current" pixel C (106). This is one conventional probability context arrangement with four pixels providing data to decode the current pixel 106.

Figure 2:
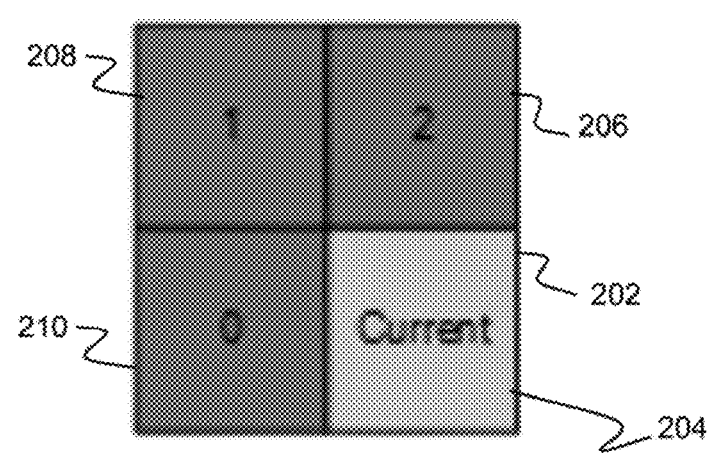
FIG. 2 is another schematic diagram of another pixel arrangement used for providing a probability context for arithmetic entropy coding.

Referring to FIG. 2 a frame 200 shows a part 202 that is another typical pixel arrangement to form the probability context, and includes three pixels "0" (210), "1" (208), and "2" (206) are used to compute the probability model context of the "Current" pixel C (204).

Figure 3:
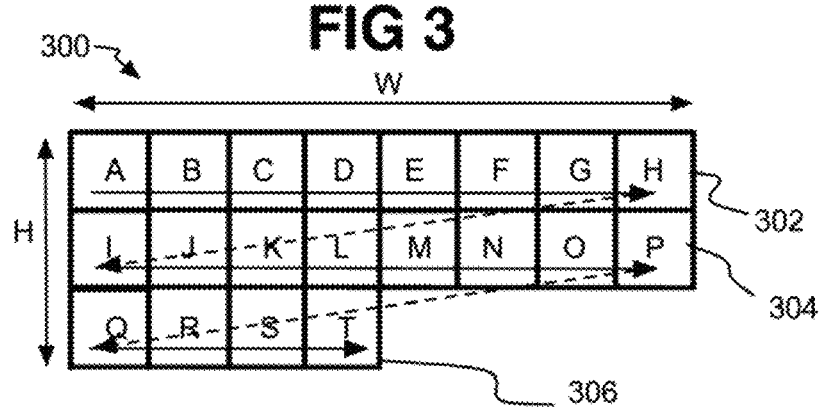
FIG. 3 is a schematic diagram to show raster-scan decoding order of pixels.

Referring to FIG. 3, in conventional compression algorithms, pixels are processed in raster-order. A simplified frame 300 is shown with three rows 302, 304, and 306, but an actual frame has many more rows. Here, the frame 300 has a total width W and a total height H, with pixel locations A to T coded, and again has many more pixel locations than shown but is simplified for the explanation here. The decoding starts with pixel A and proceeds right along the first row processing one pixel after another until pixel H. The next row on the left is then started at pixel I and proceeds right to pixel P, and again the third row starts with pixel Q and is shown to continue to the right to pixel T, but may continue to the right thereafter as well. When pixels are processed in raster scan order as shown, and neighboring pixels are used to compute the probability model context, the probability model context of each pixel must be computed sequentially. That is because in order to compute the current pixel's probability model context all the spatially neighboring pixels must be decoded. It should be noted that pixels along the edge of the frame may have less than the three or four pixel arrangement as shown in arrangements 100 or 200. In these cases, some pixels may only have one other pixel to use as the probability context, such as pixel B using pixel A as the context and so on. It can be seen pixel J is the first pixel that will have the full three or four pixel context arrangement decoded including pixel I. The decoding of pixel J must wait for the full row above it to be decoded before pixel I will be decoded. Due to this sequential requirement, in state-of-the-art video codec(s), arithmetic codec throughput or performance is the bottleneck of video codec(s) which need to support high bit-rates or high quality.

It also should be noted that framewidth raster-order (also referred to as raster-scan-order herein) refers to framewidth or frame level raster order where an entire frame row forming a full frame width is processed pixel after pixel along the row before processing of pixels in the next frame row, and unless the language context herein suggests otherwise. Thus, a non-raster order may include a process where pixels being processed in a current frame row may be performed before the processing of all pixels in a frame row above the current row is complete. On the other hand, a non-framewidth raster order may include raster-order on smaller divisions than an entire frame row such as raster-order limited to within a block so that once a row of pixels within a block is processed, the pixels of the next row within the block may be processed. An entire frame row or substantially all pixels of a frame row refer to those pixels that are to be entropy encoded and decoded and would usually be considered to form the frame, picture, or image. This may exclude pixel locations that are in margins of a frame for example or otherwise that are not to be entropy encoded and decoded and transmitted between encoder and decoder for example. Thus, this may include any pixel locations anywhere in a row of pixels that are not to be entropy encoded or decoded.

To resolve the issues mentioned above, the coder system may process the pixels in a non-framewidth raster order so that the probability model context of two or more pixels can be computed at the same time instead of sequentially, thus increasing the throughput/performance of the arithmetic decoder. This is performed by decoding or encoding a current pixel location as soon as the probability context is ready for that current pixel location instead of waiting for the completion of the decoding of the entire row of pixels above the row with the current pixel location.

By this approach, a non-raster scan processing order is used to process data that is compressed using an arithmetic codec which uses probability model contexts to improve coding efficiency. These non-raster orders enable computing two or more probability model contexts at the same time instead of sequentially for the purpose of improving throughput of the arithmetic codec using such contexts.

The throughput and/or performance of the arithmetic decoder can be further improved if (i) either a non-framewidth raster-scan or the non-raster scan order is applied per blocks or per pixel (whenever possible) instead of on the entire picture, and (ii) the probability model contexts of each pixel within the block are computed using only neighboring pixels that are inside the same block. If one or more of the neighboring pixel, as in the probability context pixel arrangement of FIG. 1 or 2, for example, are outside the block, they are not used to compute the probability model contexts. Because there is no dependency across blocks, the probability model contexts of each block or each pixel can be computed at the same time.

By this approach, the above non-raster scan order is applied to blocks of data instead of to the data of the entire frame. The blocks can be square or rectangular, and the probability model contexts of each block is computed using only data within that block. Processing stages that precede or follow the arithmetic codec may also operate on the data on a block-by-block basis. By having the arithmetic codec and these additional processing stages operating on the data using the same blocks results in one block of data generated by one stage being processed by the next stage as soon as it is available.

By an alternative block approach, a non-framewidth raster-order is used where raster order is performed for entropy decoding within each block so that the blocks still may be processed in parallel to each other thereby still providing an advantage over the full frame raster order.

By yet another approach, the per-pixel prediction syntax is interleaved with the coefficient decoding at the transform block level. By doing this, the back-end processing (e.g. reconstruction processing) can be started right away once the output of the transform block is available. This also removes the need for intermediate buffers between the arithmetic codec and preceding or following processing stages, and increases the overall throughput.

This methods herein can also be applied to other syntax elements of a video encoder or decoder which use neighboring modes or syntax elements (such as motion vectors, transform coefficients, etc.).

It will be understood that the methods herein can be applied to image and video encoder(s) in addition or instead of the decoder(s). If applied to an image or video encoder, and the probability context is identified and transmitted to the decoder, then the decoder can apply the identified probability context arrangement, and does need to be programmed to perform the decoding order methods herein. If however, the encoder applies the methodology herein but does not transmit the probability model context to the image or video decoder as part of the compressed data, then the disclosed method still should be applied at the corresponding image or video decoder because of the symmetric nature of the arithmetic codec. The symmetric nature is caused by the fact that the arithmetic decoder must use the same probability context used by the arithmetic encoder to reconstruct the data without any loss.

Figure 4:
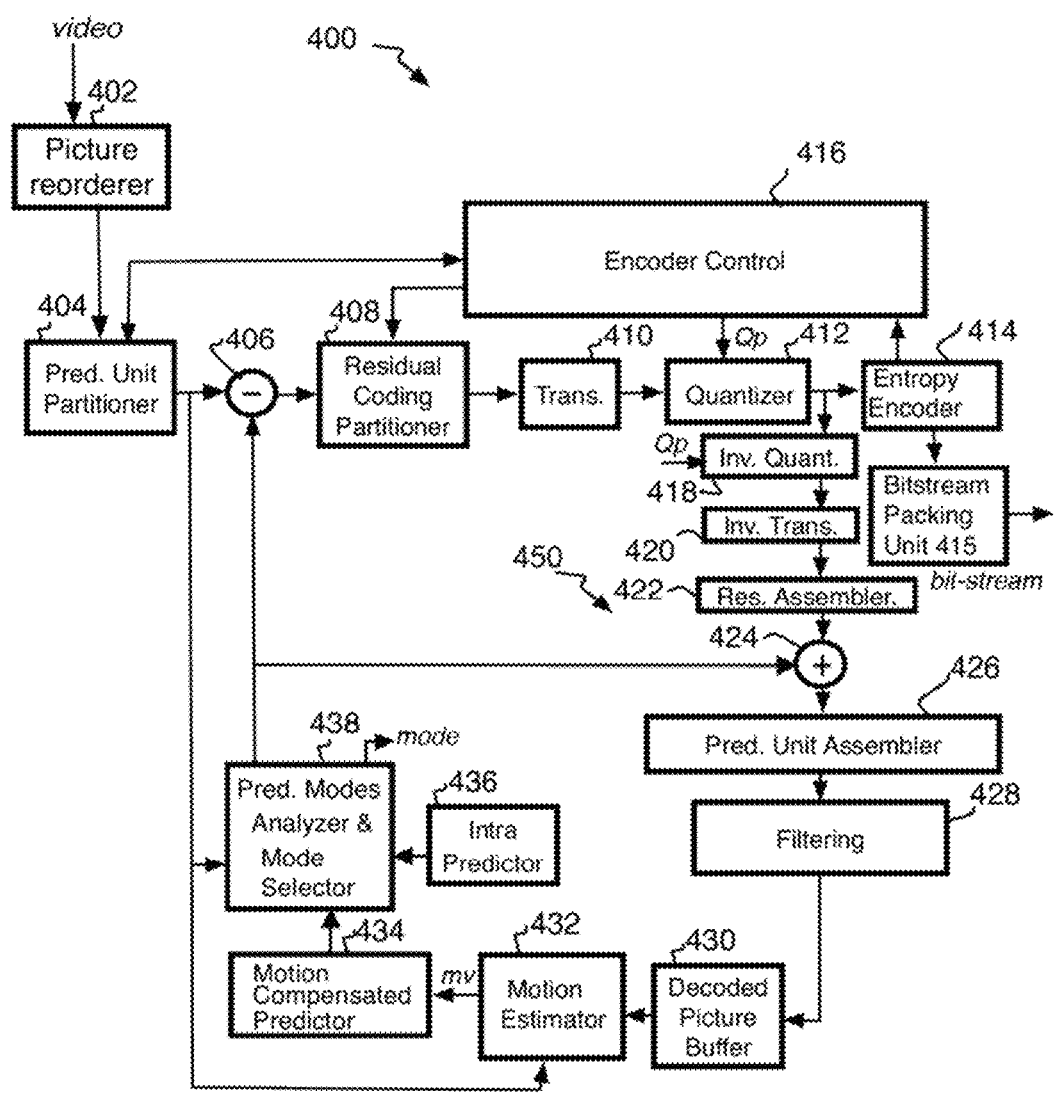
FIG. 4 is an illustrative diagram of an example encoder for a video coding system.
Figure 5:
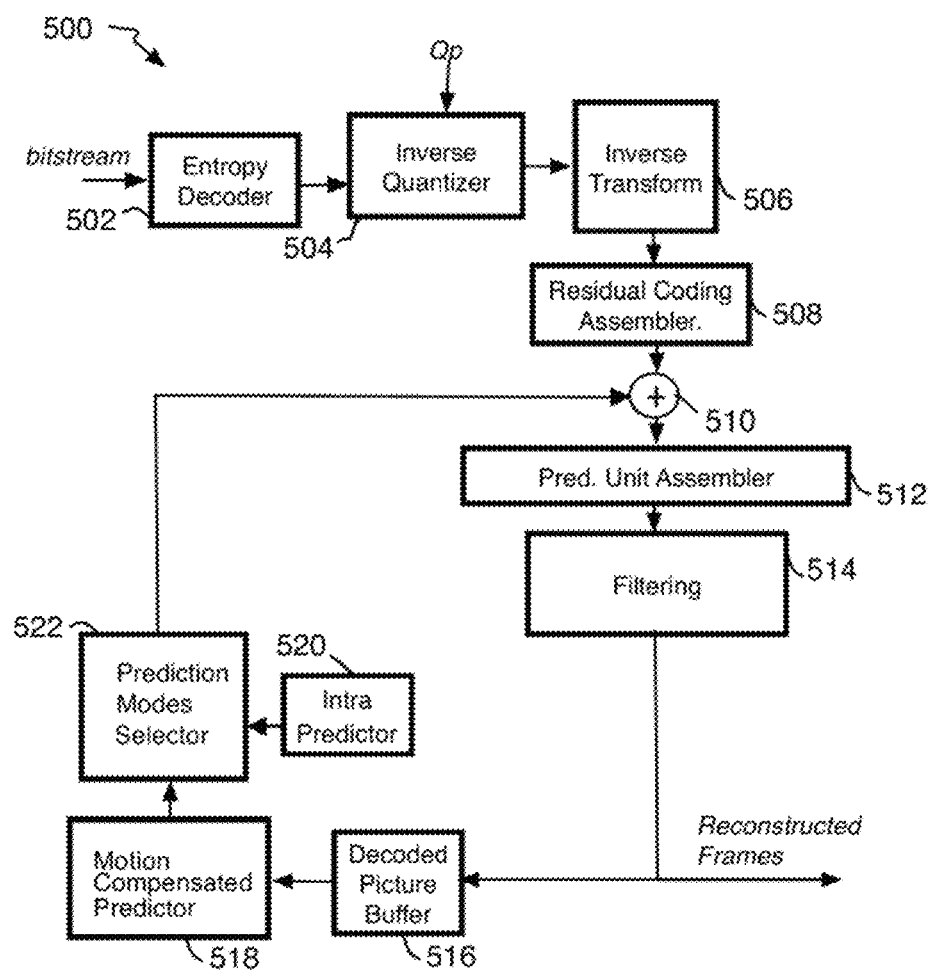
FIG. 5 is an illustrative diagram of an example decoder for a video coding system.
Figure 7:
FIG. 7 is another schematic diagram of another pixel arrangement used for providing a probability context for arithmetic entropy coding.
Figure 28:
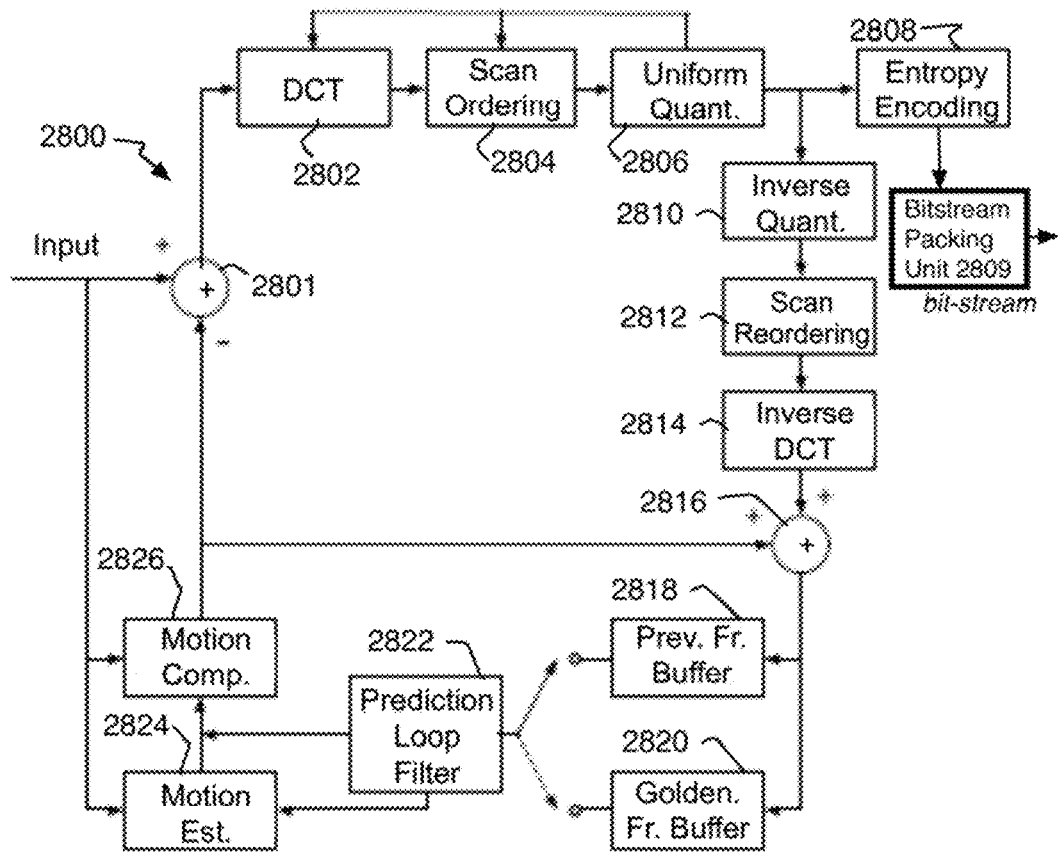
FIG. 28 is an illustrative diagram of another example encoder for a video coding system.
Figure 29:
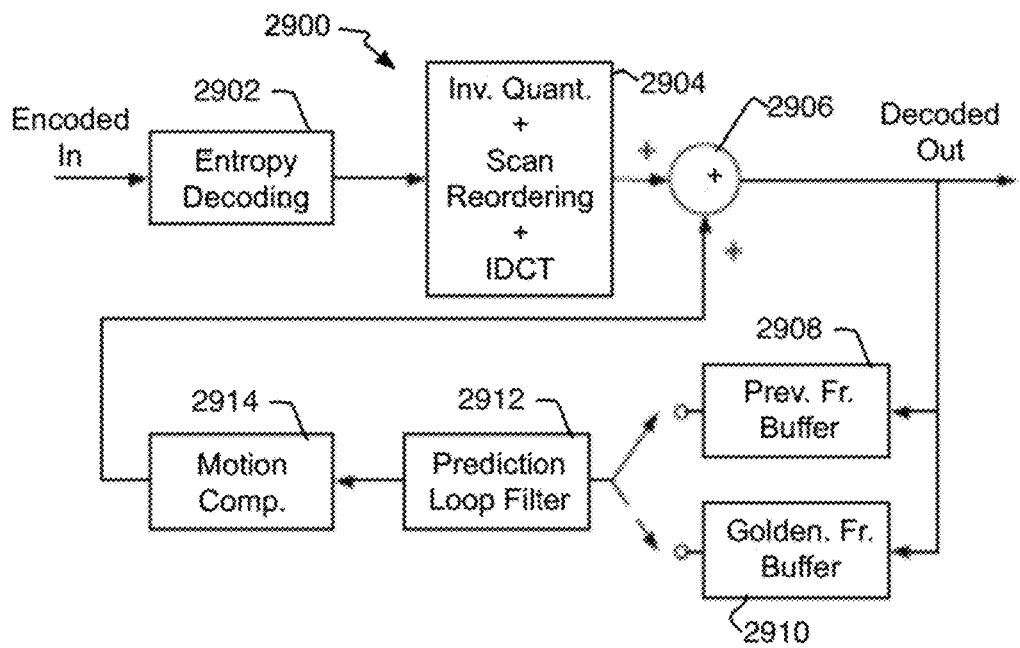
FIG. 29 is an illustrative diagram of another example decoder for a video coding system.

Referring to FIGS. 4-5, example arithmetic encoder 400 and decoder 500 is shown although these coders tend to represent more of an HEVC-type of encoder and decoder. FIGS. 28 and 29 below are diagrams that show example arithmetic VP9 encoder 2800 and decoder 2900 respectively. Many of the relevant components described for coders 400 and 500 may apply equally to VP9 coders 2800 and 2900 such that the description of all of the components of the VP9 coders 2800 and 2900 is already provided with coders 400 and 500. Some other details regarding the VP9 coders are provided after the description of coders 400 and 500.

Referring to FIG. 4, a video coding system 400 is described for better understanding of the implementations of the methods of high throughput arithmetic entropy coding for video coding described herein, and is arranged to perform at least one or more of the implementations described herein. In various implementations, video coding system 400 may be configured to undertake video coding and/or implement video codecs according to one or more standards. Further, in various forms, video coding system 400 may be implemented as part of an image processor, video processor, and/or media processor and undertakes inter-prediction, intra-prediction, predictive coding, and residual prediction. In various implementations, system 400 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, Alliance Open Media Version 1(AV1), and others. Although system 300 and/or other systems, schemes or processes may be described herein, the present disclosure is not necessarily always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. Also herein, the term coding or entropy coding refers to decoding, encoding, or both.

For the example video coding system 400, the system may be an encoder where current video information in the form of data related to a sequence of video frames may be received for compression. The system 400 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 400 may include an input picture buffer (with optional picture re-orderer) 402, a prediction unit partitioner 404, a subtraction unit 406, a residual coding partitioner 408, a transform unit 410, a quantizer 412, an entropy encoder 414, bitstream packing unit 415, and an encoder controller 416. The controller 416 manages many aspects of encoding including rate distortion or scene characteristics based locally adaptive selection of right motion partition sizes, right coding partition size, best choice of prediction reference types, and best selection of modes as well as managing overall bitrate in case bitrate control is enabled to name a few examples.

The output of the quantizer 412 may be provided to a decoding or prediction loop 450 provided at the encoder to generate the same reference or reconstructed blocks, frames, or other units as would be generated at the decoder 500. Thus, the decoding loop 450 may use inverse quantization and inverse transform units 418 and 420 to reconstruct the frames, and residual assembler 422, adder 424, and prediction unit assembler 426 to reconstruct the units used within each frame. The decoding loop 450 then provides filters 428 to increase the quality of the reconstructed images to better match the corresponding original frame. This may include a deblocking filter, a sample adaptive offset (SAO) filter, and a quality restoration (QR) filter. The decoding loop 450 also may have a decoded picture buffer 430 to hold reference frames.

The encoder 400 also has a motion estimation module or unit 432 that provides motion vectors as described below, and a motion compensation module 434 that uses the motion vectors to form prediction blocks. The motion estimation unit 432 and motion compensation unit 434 form the inter-prediction capability of the encoder. The inter-mode (inter-prediction mode) that is to be used, whether to use spatial neighbor blocks or otherwise, may be compressed and placed in a bitstream along with motion vectors and identity of reference blocks for the spatial neighbor blocks and to provide the context for the current block at the decoder. An intra-prediction module 436 provides the intra-prediction capability. Both the motion compensation module 434 and intra-prediction module 436 may provide predictions to a prediction mode analyzer and mode selector 438 that selects the best prediction mode (including inter-modes) for a particular block, typically based on bit-cost and other factors. The mode selector 438 may select an inter-mode or inter-prediction mode when multiple such modes are available. In addition to having a different inter-mode depending on the motion estimation technique used, the inter-modes may include modes that use different frames references. The selected inter-mode is compressed and placed in the bitstream with the other data. The present methods may be used to decompress the inter-mode at the decoder before applying that inter-mode to decode the context of a block.

As shown in FIG. 4, the prediction output of the selector 438 in the form of a prediction block is then provided both to the subtraction unit 406 to generate a residual, and in the decoding loop to the adder 424 to add the prediction to the residual from the inverse transform to reconstruct a frame. A PU assembler (not shown) may be provided at the output of the prediction mode analyzer and selector 438 before providing the blocks to the adder 424 and subtractor 406 for HEVC or VP9 operation to name a few examples. The prediction mode as well as the motion vector data may be provided to the entropy encoder for compression and transmission.

More specifically now, the video data in the form of frames of pixel data may be provided to the input picture buffer 402. The buffer 402 holds frames in an input video sequence order, and the frames may be retrieved from the buffer in the order in which they need to be coded. For example, backward reference frames are coded before the frame for which they are a reference but are displayed after it. The input picture buffer 402 also may assign frames a classification such as I-frame (intra-coded), P-frame (inter-coded, predicted from a previous reference frames), and B-frame (inter-coded frame which can be bi-directionally predicted from a previous frames, subsequent frames, or both. VP# coders may add a golden reference frame as well which is a specific type of P-frame that is not necessarily consecutive with the current frame.

For VP9 coding, a frame may be divided into tiles which are large sections of the frame, which are then divided into 64×64 pixel super-blocks. The super-blocks may be divided into smaller blocks, typically 16×16 or 8×8 for prediction block sizes but could be as small as 4×4.

For HEVC coding, in each case, an entire frame may be classified the same or may have slices classified differently (thus, an I-frame may include only I slices, P-frame can include I and P slices, and so forth). In I slices, spatial or intra-prediction is used, and in one form, only from data in the frame itself. In P slices, temporal (rather than spatial) prediction may be undertaken by estimating motion between frames but also may include spatial dependencies to derive motion vectors as explained herein. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 404 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 26×26, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "large block" may refer to an LCU or a super-block or other similar block set by a video coding specification or a block size that is the main granularity unit of the hardware that provides the pipeline for processing or coding the video frames. In other words, the pipeline may have a number of units—named stages in the following—each unit implementing a different part of the overall encoding or decoding process. The large blocks enter the pipeline sequentially and are processed sequentially by moving from stage to stage. Therefore different stages of the pipeline process a different large block at the same time. The large block may be divided into a variety of other small block sizes, such that the term "small block" may refer to a CU, or to a PU as described above and similar sizes for VP# coding, and a macroblock refers to a 16×16 size block. The blocks need not always be square shaped blocks. Non-square rectangular shapes also can be included as described above. By some alternatives, this may include considering the block a macroblock or a division of a macroblock of video or pixel data for H.264/AVC, AV1, VP8, VP9, and the like, unless defined otherwise. At a minimum then, a large block is a block that is divided into smaller blocks so that the smaller blocks can be reconstructed during a decoding process and proceed small block by small block.

Also in video coding system 400, the current video frame divided into super-block, LCU, CU, and/or PU sized units may be provided to the motion estimation unit or estimator 432. System 400 may process the current frame in the designated units of an image in raster or different scan order such as waveforms mentioned elsewhere herein. When video coding system 400 is operated in inter-prediction mode, motion estimation unit 432 may generate a motion vector based on spatial neighbor blocks. The motion compensation module 434 then may use the reference video frame and the motion vector provided by motion estimation module 432 to generate a prediction for each prediction block with a motion vector.

If inter-prediction is selected as the correct mode for a prediction block, the predicted block then may be subtracted at subtractor 406 from the current block, and the resulting residual is provided to the residual coding partitioner 408. Coding partitioner 408 may partition the residual into one or more blocks, and by one form for HEVC, dividing CUs further into transform units (TU). A transform module 410 then transforms the divided residual data of the TUs into transform coefficients using variable block size discrete cosine transform (VBS DCT) and/or 4×4 discrete sine transform (DST) to name a few examples. Using the quantization parameter (Qp) set by the controller 416, the quantizer 412 then uses lossy resampling or quantization on the coefficients.

During entropy encoding of context data such as the inter-mode, motion vectors, identity of reference blocks, intra-prediction pixel data, and transform coefficients, a context model or probability model for context-based adaptive binary arithmetic coding (CABAC) may be used that uses the symbol values of the spatial neighbor blocks to determine the symbols to compress at the encoder for the current block. Herein, this process may be reversed at the decoder, and may be used to perform the symbol context method as explained below.

The generated set of quantized transform coefficients may be reordered and entropy coded by entropy coding module 414. The entropy coder 414 may also perform other tasks to implement the methods described below including performing entropy coding on a block-by-block basis rather than (or in addition to some areas) performed on the pixel data of a frame as a whole, and whether those blocks are formed just for the entropy coding or are already partitioned blocks from prediction, transform coding, or any other coding. This data is then placed in a bitstream by bitstream packing unit 415 to generate a portion of a compressed bitstream (for example, a Network Abstraction Layer (NAL) bitstream) provided by video coding system 400. In various implementations, a bitstream provided by video coding system 400 may include entropy-encoded coefficients in addition to side information to be used to decode each block. For example, this may include prediction modes, quantization parameters, motion vector information, partition information, in-loop filtering information, and so forth. The bitstream also may be provided to other systems and/or devices for transmission or storage.

The bitstream packing unit 415, which may or may not be a multiplexer that adds audio data as well as all of the video data, may implement the high throughput arithmetic entropy coding methods, and particularly by using the interleaved bit packing of the bitstream as described below where the per-pixel prediction data is packed before the residual data of the same transform block so that block can be reconstructed relatively quickly. When per-pixel prediction data and residual data of the same block are packed together, the decoder hardware architecture can implement a more efficient pipelining because the reconstruction process at the decoder side that combines prediction and residual, and then further process their combination, can start as soon as both prediction and residual data of the same block are entropy decoded. Arithmetic decoding is a sequential process that must process bits in the order in which they have been packed; so if the arithmetic encoded prediction data of multiple blocks are all grouped together, the arithmetic decoder needs to decode all of them before being able to decode the first block of arithmetic encoded residual data. A more efficient decoder pipelining results in a higher decoder throughput.

The output of the quantization module 412 also may be provided to de-quantization unit 418 and inverse transform module 420 in a decoding loop. De-quantization unit 418 and inverse transform module 420 may implement the inverse of the operations undertaken by transform unit 410 and quantization module 412. The residual assembler unit 422 may then reconstruct the residual CUs from the TUs. The output of the residual assembler unit 422 then may be combined at adder 424 with the predicted frame to generate a rough reconstructed block. The prediction unit assembler 426 then reconstructs the LCUs from the CUs to complete the frame reconstruction.

The reconstructed frames are filtered, and then provided to the decoded picture buffer 430 where the frames may be used as reference frames to construct corresponding predictions for motion estimation and compensation as explained herein. When video coding system 400 is operated in intra-prediction mode, intra-prediction module 436 may use the reconstructed pixels of the current frame to undertake intra-prediction schemes. Most intra-prediction schemes involve using the decoded data from the left and/or upper prediction blocks relative to a current block being analyzed in a raster or waveform-type of scheme.

In some examples, video coding system 400 may include additional items that have not been shown in FIG. 1 for the sake of clarity. For example, video coding system 400 may include a processor, a radio frequency-type (RF) transceiver, splitter and/or multiplexor, a display, and/or an antenna. Further, video coding system 400 may include additional items such as a speaker, a microphone, an accelerometer, memory, a router, network interface logic, and so forth. Some of these components are shown on other implementations described herein.

Referring to FIG. 5, a system 500 may have, or may be, a decoder, and may receive coded video data in the form of a bitstream and that has the image data (chroma and luma pixel values) as well as context data including residuals in the form of quantized transform coefficients, motion vectors, identity of reference blocks, and prediction modes for individual blocks. The system 500 may process the bitstream with an entropy decoding module 502 to extract chroma and luma pixel data, quantized residual coefficients as well as the motion vectors, prediction modes, partitions, quantization parameters, filter information, and so forth. The entropy decoder 502 may use one or more of the methods described below to perform high throughput arithmetic entropy decoding to perform parallel arithmetic decoding of more pixels and whether with a three or four block probability context (or other probability context arrangement), and whether on a frame basis or block basis. The entropy decoder 502, or another unit, also may extract per-pixel prediction data placed before the residual data of the same transform block to further increase the throughput. The system 500 then may use an inverse quantizer module 504 and inverse transform module 506 to reconstruct the residual pixel data. The construction of the residual pixel data may be performed by using spatial neighbor blocks to form the prediction context as usual when the blocks are fully decoded as well.

The system 500 then may use a residual coding assembler 508, an adder 510 to add the residual to the predicted block, and a prediction unit assembler 512 for small blocks and large blocks (LCU or super-blocks for example). The system 500 also may decode the resulting data using a decoding technique employed depending on the coding mode indicated in syntax of the bitstream and implemented via prediction mode switch or selector (which also may be referred to as a syntax control module) 522, and either a first path including an intra prediction module 520 or a second path that is an inter-prediction decoding path including one or more filters 514. The second path may have a decoded picture buffer 516 to store the reconstructed and filtered frames for use as reference frames as well as to send off the reconstructed frames for display or storage for later viewing or another application or device. For VP# codecs, this may include reconstructing and storing golden frames as well. A motion compensated predictor 518 utilizes reconstructed frames from the decoded picture buffer 516 as well as motion vectors from the bitstream to reconstruct a predicted block. Thus, the decoder does not need its own motion estimation unit since the motion vectors are already provided, although it still may have one. The prediction modes selector 522 sets the correct mode for each block as mentioned, where the prediction mode may be extracted and decompressed from the compressed bitstream. A PU assembler (not shown) may be provided at the output of the selector 522 before the blocks are provided to the adder 510. The functionality of modules described herein for systems 400 and 500, except for the entropy encoder and decoder, and bitstream packer for example and described in detail herein, are otherwise well recognized in the art and will not be described in any greater detail herein.

Referring to FIGS. 28-29, an example VP9 encoder 2800 and an example VP9 decoder 2900 are provided to show another example video system with an alternative codec standard that could be used to implement the high throughput arithmetic entropy coding methods described herein. The VP9 systems 2800 and 2900 have many of the same or similar components as the encoder and decoder 400 and 500 described above, and the relevant aspects of VP9 codec are already mentioned above. It will be clear which components perform similar functions and need not be described here again. Both the VP9 encoder 2800 and decoder 2900 expressly add scan ordering (or reordering) unit 2804 or 2904 between a DCT or iDCT unit and a uniform quantization (or inverse quantization) unit, as well as a golden frame buffer 2820 or 2910. Each of these additional components are known in the VP9 codec and need no special explanation. It will be understood that the VP9 encoder 2800 may have a bitstream packing unit 2809, and the encoder 2800 and decoder 2900 respectively have entropy coders 2808 and 2902 that function as described with entropy coders 414 and 502.

Some video encoders are implemented in software and others with full or partial hardware acceleration. Fully hardware accelerated solutions do not offer as much scalability and flexibility as the partial or hybrid solutions. Herein, the efficiency of hybrid architecture for video encoding can be improved using the context decoding and reconstruction bypass methods described. With hybrid solutions, some work can be performed on execution units (EUs) and other work may be performed on fixed function hardware. To maximize the performance, the fixed function hardware is fully utilized. The present encoder that performs the methods described herein may use one or more video motion estimate (VME) engines as the main fixed function hardware.

The parallel entropy processing or entropy coding of different pixels or pixel locations at the same time described herein may simply refer to context switching at the same one or more processors such that the entropy processing of one pixel location on one row does not necessarily need to sequentially wait for the entropy processing of another pixel location on another row due to raster-order. On the other hand, some systems may provide shared or dedicated parallel circuits, such as at the VMEs or other shared or dedicated parallel circuits on one or more image signal processor (ISPs) for example, to perform the parallel entropy coding at the same time described herein. Other details of such parallel circuits are described below.

Referring to FIG. 6, an example process 600 is arranged in accordance with at least some implementations of the present disclosure. In general, process 600 may provide a computer-implemented method of high throughput arithmetic entropy coding for video coding. In the illustrated implementation, process 600 may include one or more operations, functions or actions as illustrated by one or more of operations 602 to 614 generally numbered evenly. By way of non-limiting example, process 600 may be described herein with reference to operations discussed with respect to FIGS. 1-5 and 7-22 herein and may be discussed below with regard to example systems 400, 500, 2800, 2900, or 2500, and where relevant.

Process 600 may include "obtain a plurality of frames of a video sequence, wherein individual frames are formed of data from rows of pixels" 602. This may include obtaining a video sequence that needs to be compressed for transmission to another device. This may include capturing a video sequence with a camera or obtaining the video sequence from a memory in order to encode the video. It also may include obtaining a compressed video sequence from a bitstream and at a device with a decoder in order to decompress the video sequence. This operation also may include whatever other preliminary steps are necessary to place the video sequence in a condition ready for entropy encoding or entropy decoding. On the encoder side, this may include any pre-processing of the video sequence, such as demosaicing, noise reduction, and so forth, as well as video coding operations up to the entropy encoding including transform and quantization of residuals, obtaining pixel image data such as chroma and luminance values, and so forth. On the decoder side, this operation may include any operations to extract the video data from a received bitstream, placement of the compressed video data in a memory, and any other operations that may be used to prepare the video data for entropy decoding.

Process 600 may include "determining a spatial neighbor probability context to be used to arithmetically entropy code data of a current pixel location comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame" 604. As explained elsewhere herein, the spatial neighbor probability context is obtained from pixel data of pixel locations adjacent or near a current pixel location being encoded or decoded using arithmetic entropy coding here. This may be applied to the three pixel or four pixel arrangements for spatial neighbor probability context as described above or other entropy coding context pixel patterns. In contrast to full-frame width (or just framewidth) raster order, here a current pixel location may be entropy coded before all of the pixel locations on the row directly above the current pixel location are entropy coded. This refers to sufficient entropy processing of a pixel location so that it can be used to compute a probability that contributes to the spatial neighbor probability context of the current pixel location being entropy coded. The determination of the spatial neighbor probability context, and the use of the context to entropy code the current pixel location, can be performed before all of the pixels (or pixel locations) in the above row are entropy coded. This may refer to non-raster order when multiple current pixel locations can be entropy coded in parallel (or simultaneously). This also may refer to non-framewidth raster order which uses raster order on a block-level rather than a frame-level, or other non-framewidth level, as described herein. In this case, the entropy coding within a block may be by raster order or non-raster order. Such an arrangement may have multiple current pixel locations being entropy coded at multiple locations simultaneously on the same row, but in different blocks. With the elimination of the framewidth raster order, the entropy coding is no longer purely sequential so that entropy coding of one pixel location is not delayed by the entropy coding of all pixel location locations in the frame row above the current pixel location. When blocks are used, with individual blocks using a non-raster order, a double parallelism is formed with parallel operation of blocks and parallel entropy coding of multiple current pixel locations within a single block, further reducing any latency caused by the entropy coding and better balance with the quality of the resulting images from a device that provides video coding. Other details are provide below.

Process 600 may include "use the spatial neighbor probability context to perform arithmetic entropy encoding or decoding of the data of the current pixel location" 606. The probability context is then used to entropy encode or decode the current pixel location. On the encoder side, the entropy encoded pixel data then may be packed into a bitstream for transmission. On the decoder side, the entropy decoded pixel data, such as the residual data, then may be used at inverse quantization operations to begin reconstructing frames forming the video sequence.

To build upon operation 604, process 600 optionally many include "perform the entropy coding of multiple current pixel locations in parallel on multiple different rows of the same frame" 608, and when a non-raster order is being used. This may include performing framewidth raster order on part of a frame, and performing non-raster order on another part of a frame. Many different variations are contemplated.

Optionally, process 600 many include "divide the frames into entropy blocks of a plurality of pixels that is less than the entire frame" 610, and "entropy code one or more current pixel locations in individual entropy blocks in parallel to the coding of current pixel locations in other entropy blocks" 612, This operation also may include the coder forming the spatial neighbor context data of a current pixel location only with data within the same entropy block as the current pixel location. It will be understood that the entropy block partitioning may match the block partitioning for other purposes such as prediction blocks and/or transform blocks, or otherwise, the block definitions may be formed solely for entropy coding with different shapes, sizes, positions, or any combination of these compared to the non-entropy coding blocks. Such block definitions may be formed at the encoder and then matched at the decoder.

Also, less than all of the frame may be divided into entropy blocks, and the coder may apply block-level raster order to some of the entropy blocks and non-raster order to other entropy blocks on the same frame. Many other variations are possible.

In addition, these entropy coding orders may be combined with a bitstream packing scheme that includes using per-pixel prediction data packed in a bitstream package adjacent transform coefficient data of the same block to form an alternating pattern of prediction data and transform data paired for the same block and along the bitstream package.

While the examples described herein may be for the case of probability model context(s) used by an arithmetic decoder to entropy decode pixels of a frame of a video sequence rather than or in addition to the encoder, as mentioned above though, these methods also can be applied to image encoder(s). If the method is applied to an image or video encoder, then the same methods should be applied to the corresponding image or video decoder.

A number of non-raster orders described herein enables computing two or more probability model contexts at the same time instead of sequentially for the purpose of improving throughput of the arithmetic codec using such contexts. Examples of these are provided below, and the data are pixels of a frame of a video sequence which are entropy coded using an arithmetic codec that uses probability model contexts to improve the coding efficiency. A probability model context is selected for each pixel using information derived from previously decoded pixels which are neighbors of the sample. By using a non-raster scan order to process the pixels, the probability model context of two or more pixels can be computed at the same time instead of sequentially. This increases the throughput and/or performance of the arithmetic codec.

Referring to FIGS. 7-11, the non-raster order decoding (or encoding) for the probability model context of a current pixel using up to four neighboring previously decoded pixels may proceed as shown in pixel arrangements 700 to 1100. Using this scanning arrangement, the probability model context of all the lighter pixel locations can be computed at the same time because all their neighbors have been previously decoded. It will be understood that only the left side of a frame is shown in FIGS. 7-11, and each row may have many more pixels to the right of that shown.

For example then, starting decoding of a frame, there is no contact for upper left corner pixel A on arrangement 700. B uses A for context. Shown here, pixel location D uses pixel location B for context and is processed in parallel to pixel location C here, which uses pixel location A (or A and B) for context. Unusual here is that the processing (encoding or decoding) of C does not wait for the processing of all of the pixels in the adjacent above row with pixel locations A to D and beyond to the right for the entire row of a frame before starting its decoding.

Figure 8:
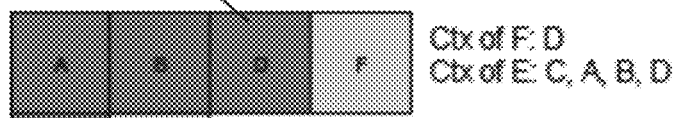
FIG. 8 is another schematic diagram of another pixel arrangement used for providing a probability context for arithmetic entropy coding.

Referring to FIG. 8, likewise for arrangement 800, while pixel location F uses pixel location D for probability context for decoding, decoding of pixel location E may commence by using pixel locations C, A, B, and D which is the full four pixel location probability context, and again, is performed without waiting for the entire row of pixel locations A to F being completed.

Figure 9:
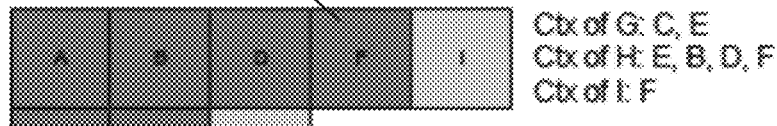
FIG. 9 is another schematic diagram of another pixel arrangement used for providing a probability context for arithmetic entropy coding.

Referring to FIG. 9, continuing the example on an arrangement 900, the system decodes pixel locations I, H, and G in parallel where pixel location I uses pixel location F as context; pixel location H uses pixel locations E, B, D, and F as context; and pixel location G uses pixel locations C and E as context.

Figure 10:
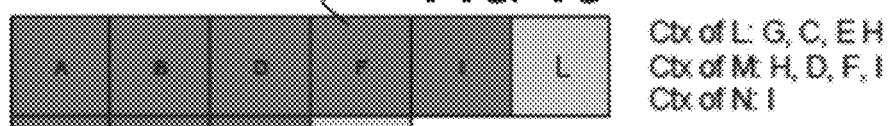
FIG. 10 is another schematic diagram of another pixel arrangement used for providing a probability context for arithmetic entropy coding.

Referring to FIG. 10, the system may have an arrangement 1000 that decodes pixel locations J, K, and L in parallel where pixel location L uses pixel location I as context; pixel location K uses pixel locations H, D, F, and I as context; and pixel location J uses pixel locations G, C, E, and H as context.

Figure 11:
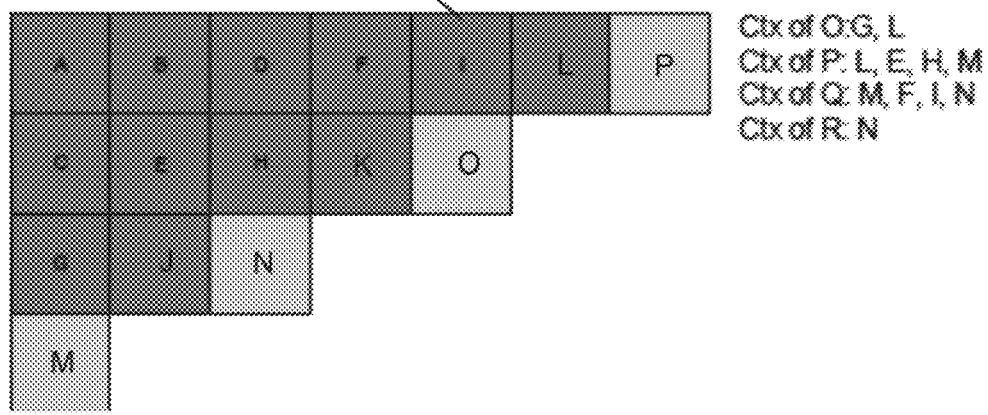
FIG. 11 is another schematic diagram of another pixel arrangement used for providing a probability context for arithmetic entropy coding.

Referring to FIG. 11, the system may have an arrangement 1100 that decodes pixel locations M, N, O, and P in parallel where pixel location P uses pixel location L as context; pixel location O uses pixel locations K, F, I, and L as context; pixel location N uses pixel locations J, E, H, and K as context; and pixel location M uses pixel locations G and J as context.

Thus, it will be understood that as each row is added on, another pixel location can be decoded in parallel so that the number of pixel locations being processed in parallel increases, and until some limit as to how many pixel locations can be performed is reached or the bottom row in the frame is reached. The limit could be set by processor, whether processor capacity or the number of parallel circuits that may be used, or memory capacity, or could be by some other criteria if desired.

Referring to FIGS. 12-15, in another approach for non-raster order decoding (or encoding) when the probability model context of the current pixel uses three neighboring previously decoded pixels, one example progression is shown on pixel arrangements 1200 to 1500. Using this scanning arrangement, the probability model context of all the lighter colored pixels can be computed at the same time because all their neighbors have been previously decoded.

Figure 12:
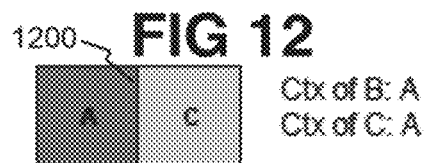
FIG. 12 is another schematic diagram of another pixel arrangement used for providing a probability context for arithmetic entropy coding.

Referring to FIG. 12 to start this example where only a maximum of three pixel locations are used for the probability context, arrangement 1200 has pixel location A which does not use a context, and then pixel locations B and C both using pixel location A as context are decoded in parallel.

Figure 13:
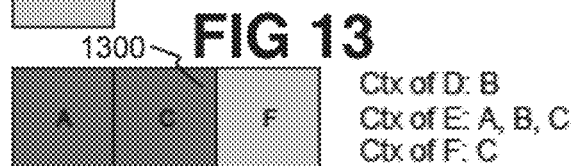
FIG. 13 is another schematic diagram of another pixel arrangement used for providing a probability context for arithmetic entropy coding.

Referring to FIG. 13, the system has an arrangement 1300 that decodes pixel locations F, E, and D in parallel where pixel location F uses pixel location C as context; pixel location E uses pixel locations B, A, and C as context; and pixel location D uses pixel location B as context (or could wait to use B and E as context).

Figure 14:
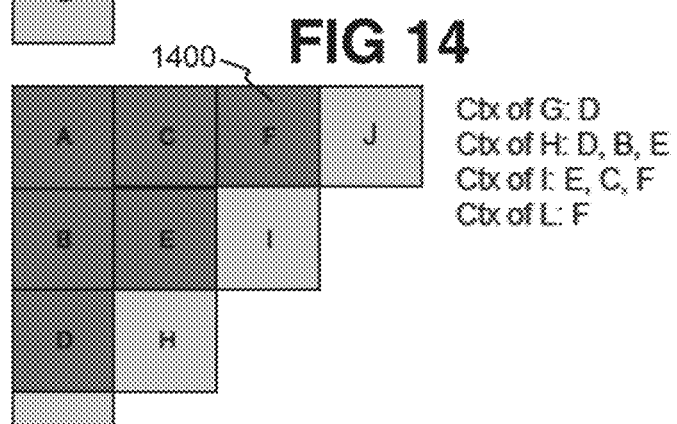
FIG. 14 is another schematic diagram of another pixel arrangement used for providing a probability context for arithmetic entropy coding.

Referring to FIG. 14, the system has an arrangement 1400 that decodes pixel locations G, H, I, and J in parallel where pixel location J uses pixel location F as context; pixel location I uses pixel locations E, C, and F as context; pixel location H uses pixel locations D, B, and E as context; and pixel location G uses pixel location D (or it can wait to use D and H) as context.

Figure 15:
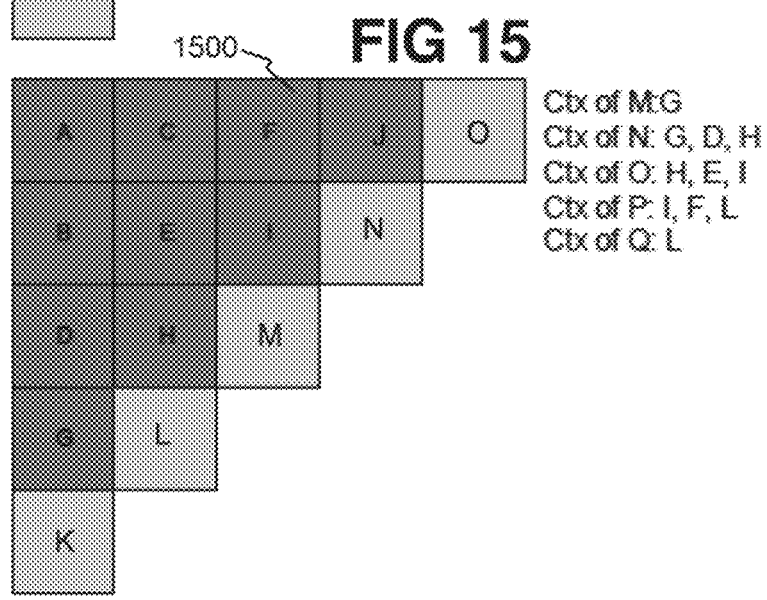
FIG. 15 is another schematic diagram of another pixel arrangement used for providing a probability context for arithmetic entropy coding.

Referring to FIG. 15, the system has an arrangement 1500 that decodes pixel locations K, L, M, N, and O in parallel where pixel location O uses pixel location J as context; pixel location N uses pixel locations I, F, and J as context; pixel location M uses pixel locations H, E, and I as context; pixel location L uses pixel locations G, D, and H as context; and pixel location K uses pixel location G as context (or can wait to use both G and L as context).

By observing the entropy decoding order for arrangements 700 to 1500, it will be understood that the multiple pixel locations that are being decoded on different rows in parallel and at the same time form, or is represented by, a diagonal wavefront that moves across the frame and in contrast to the single decoding point that moves from one row to the next row and along the row in a purely frame-width raster order.

Referring to FIGS. 16-18, in yet another form, instead of applying either the conventional raster-scan order or the non-raster scan order of the methods just described to the entire picture (referred to as per-pixel order and proceeds for entire rows of a picture), the decoding may proceed block by block. For this example, probability model contexts of each pixel within the block are computed using only neighboring pixels that are inside the same block. If one or more of the neighboring pixel (as shown in the arrangements 100 (FIG. 1) or 200 (FIG. 2)) are outside of the current block being processed, these outside pixel locations are not used to compute the probability model context of the pixel location within the block. Because there is no dependency across blocks, the probability model contexts of each block can be computed at the same time.

Referring to FIG. 16, a frame 1600 shows the non-raster order decoding being performed in parallel on multiple rows so that pixel locations are being decoded in parallel with one pixel location at each row as described above with schemes or arrangements 700 to 1500. As mentioned, the parallelism continues across the entire row of a picture and along the rows from the left edge of the picture to the right edge of the picture in this example, but could be the opposite direction. Also as mentioned, the number of pixels being analyzed in parallel may be the number of rows or some other limitation related to the processor or memory.

Referring to FIG. 17, a frame 1700 is shown partitioned into blocks, and here eight blocks 1702, where each block is decoded separately but in parallel to other blocks. Within each block, non-raster order decoding is performed so that multiple pixel locations within a single block are being decoded in parallel as well, providing two levels of parallelism.

Referring to FIG. 18, a frame 1800 has the same block configuration as frame 1700, except now frame 1800 uses block-level or block-based raster order decoding within each block 1802 rather than the parallel raster order decoding. Thus, pixel locations are entropy encoded, and decoded, across a row for an entire block width, but still much less than a row of an entire frame.

Since the blocks only use pixel locations within the block itself to provide the probability context for any other block, the upper left corner of multiple independent blocks may be the starting point for the progression of entropy encoding in the individual blocks and proceeds similar to the coding of the upper-most row and left most column on a frame where pixel locations in the top row and left column of a block do not use the full amount of pixel locations to form the probability context of a current pixel location. Thus, the borders of the boxes may have a lower quality (or accurate) decoding. Thus, a balance should be selected as to a higher number of blocks for greater speed and larger bitrate (better throughput) versus a lower number of blocks for quality. This balance should be predetermined and set with other video coding parameters at both encoder and decoder, or set at the encoder and transmitted to the decoder. By one form, the blocks are 8×8 but could be as large as 64×64 or as small as 4×4, or could be non-square sizes, such as rectangles or irregular shapes.

By one approach, the blocks may be initially partitioned for other reasons and reused for entropy coding. Specifically, in the conventional video compression algorithms, processing stages that precede or follow the arithmetic codec also may operate on blocks rather than on the entire frame. If both the arithmetic codec and these additional processing stages operates per block, the size and location of the entropy coding blocks may be set the same as the blocks used for other purposes (or stages) such as prediction blocks for intra or inter prediction or transforming such as for DCT transforming of residuals. Then, one block of data generated by one stage can be processed by the next stage as soon as it is available such as for the example probability model context(s) used by an arithmetic decoder in order to decode the pixels of a frame of a video sequence.

In order to match the partitioning of a frame into blocks for prediction for example, and to be used for entropy coding as well, the blocks for the entropy coding may be many different varying sizes on the same frame, and as that provided by one of the standards, such as HEVC described above. Thus, one block could be 4×4 and another block could be 16×32, and so forth. The arithmetic entropy coding then is not limited to a certain square or rectangle size, but could be when desirable.

Alternatively, the frames are divided into entropy coding blocks specifically for the purpose of entropy coding. Thus, the entropy blocks may have different sizes, positions, shapes, or any combination, and may be a different number of blocks compared to blocks for prediction or for transforming. This may be set regardless of the size, position, and shape of the non-entropy blocks. The number, size, and position of blocks may vary from frame to frame, or may be fixed for a particular sequence of frames. Many variations are contemplated.

It also will be understood that less than the entire frame may be divided into, or has, blocks for arithmetic entropy coding, and may occur in some but not all blocks in a frame. Thus, a part of a frame may decoded in raster order, while some blocks in a frame may be decoded in non-raster order as described here. Otherwise, a part of a frame could be entropy coded in non-raster order whether or not within entropy blocks in the frame, while the remainder of the frame is entropy coded in raster-order. Again, this decision may be a balance between quality and throughput whether a predetermined parameter setting or determined during operation as conditions warrant a change in the balance.

Figure 19:
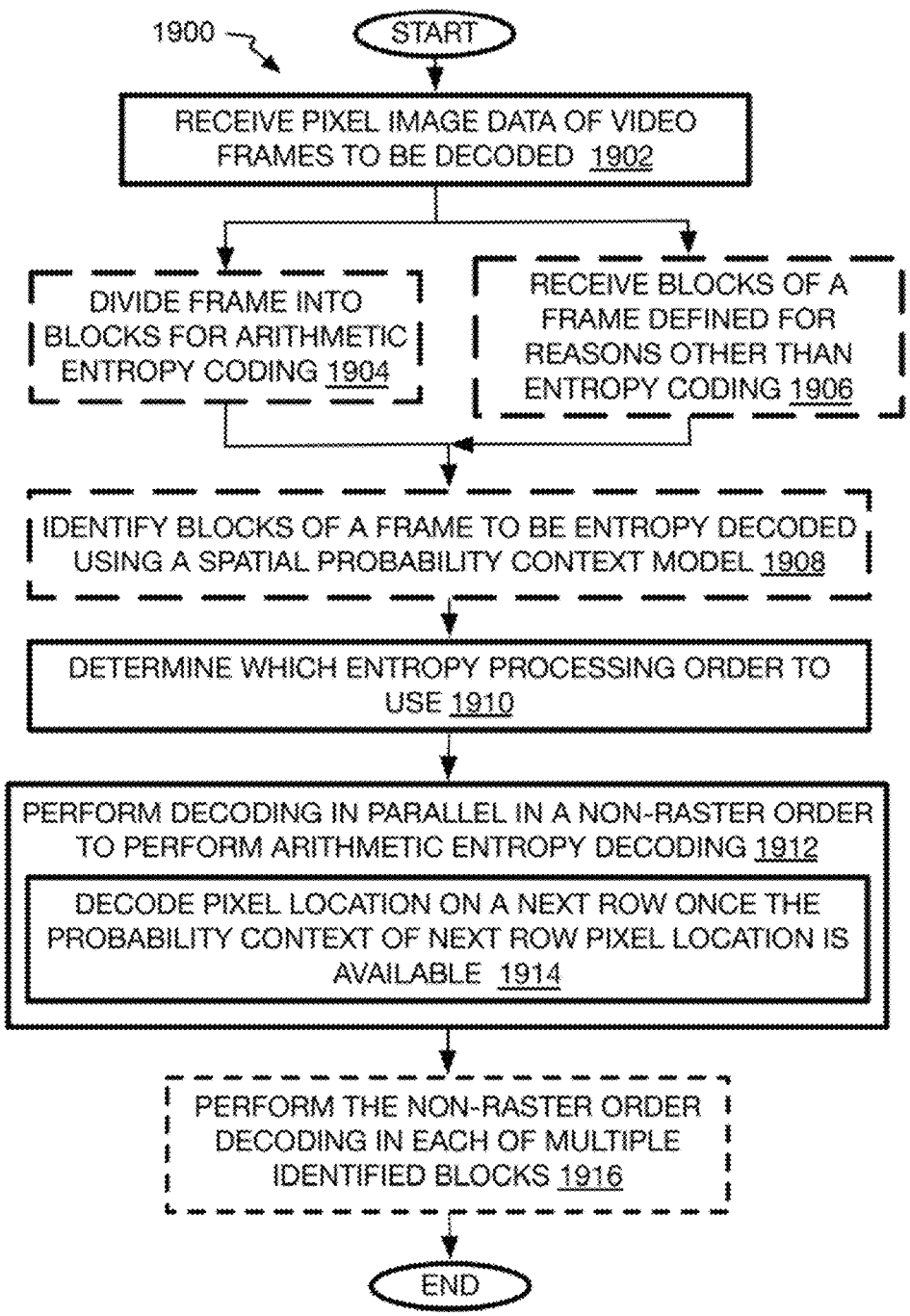
FIG. 19 is a schematic diagram of a per pixel transcoding block arrangement according to the implementations described herein.
Figure 20:
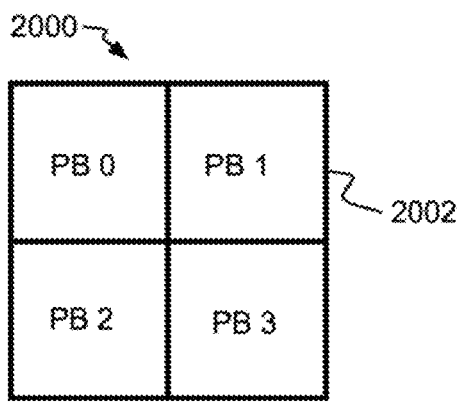
FIG. 20 is a schematic diagram of a residual syntax transcoding block arrangement according to the implementations described herein.
Figure 21:
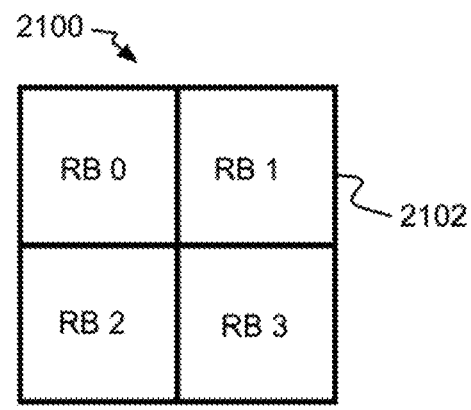
FIG. 21 is a schematic diagram of a conventional bit packing arrangement for encoding data.
Figure 22:
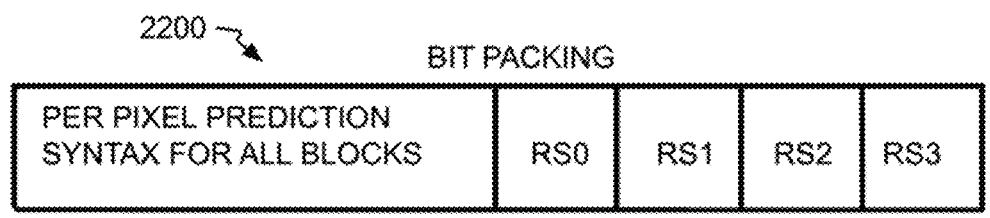
FIG. 22 is a schematic diagram of a bit packing arrangement for encoding data according to the implementations herein.

Referring now to FIG. 19, an example process 1900 is arranged in accordance with at least some implementations of the present disclosure. In general, process 1900 may provide a computer-implemented method of high throughput arithmetic entropy coding for video coding and is particularly directed to the non-raster order of the decoding or encoding, whether the coding is frame based or block based. In the illustrated implementation, process 1900 may include one or more operations, functions or actions as illustrated by one or more of operations 1902 to 1914 generally numbered evenly. By way of non-limiting example, process 1900 may be described herein with reference to operations discussed with respect to FIGS. 1-5 and 7-22 herein and may be discussed below with regard to example systems 400, 500, 2800, 2900, or 2500.

Process 1900 may include "receive pixel image data of video frames to be decoded" 1902, and as described above with operation 602. Process 1900 may be applied at the encoder or the decoder or both.

As mentioned, the entropy coding may proceed on a per-pixel mode over an entire frame, or parts of a frame to be entropy coded for example. By another alternative, the entire frame, or parts of the frame may be divided into entropy blocks of multiple pixel locations and that are entropy coded separately so that multiple entropy blocks can be entropy coded in parallel. Thus, optionally, process 1900 may include "divide frame into blocks for arithmetic entropy coding" 1904. This refers to an entropy coding operation that uses entropy blocks to provide parallel entropy coding of multiple blocks to reduce latency caused by entropy coding. For this operation, the frames are divided into entropy blocks that may have different dimensions and positions than non-entropy blocks used for other purposes such as prediction blocks and transform blocks as described above. Thus, the shape, size, and position of the entropy blocks, and in turn, the number of entropy blocks on a frame, may be different than that of the non-entropy blocks. By one form, the dimensions and positions of the entropy blocks are determined separately and regardless of how the non-entropy blocks are formed.

The shape, dimensions, and position of the entropy blocks may be determined by balancing image quality (or performance) and throughput (or efficiency or bitrate). As mentioned, one feature of the entropy blocks is to have the coder only use spatial neighbor probability context data from pixel locations within the same entropy block as the current block being coded. This reduces or eliminates block dependency and the requirement to entropy code entropy blocks in sequence. However, the more entropy blocks on a frame, the more pixel locations at an edge of a block, and the more edge pixel locations that have less than the full number of pixel locations contributing to its spatial neighbor probability context, thereby lowering the quality of the image. Thus, lower the number of blocks and greater size of the blocks, reduces the amount of entropy coding that can be performed in parallel by processing multiple entropy blocks at the same time. Such balances may be determined by experimentation, and some set balances may be used depending on a desired bitrate or quality for example. Other algorithms may be applied as well to determine the desired balance on the fly.

With such techniques, the entropy blocks may be established in uniform (or non-uniform) rows and columns across an entire frame for example, and by one example where all of the entropy blocks are the same size. By another example, the entropy blocks may be made larger for foreground areas for better quality, and smaller for less important background areas of an image for example for better throughput.

Alternatively, or in addition, process 1900 may include "receive blocks of a frame defined for reasons other than entropy coding" 1906. Thus, the dimensions and position of non-entropy blocks such as prediction blocks having intra or inter prediction values, or transform (or residual) blocks having transform coefficients, may be received, and these block dimensions and positions may be used as the entropy block dimensions and positions. Thus, the entropy blocks may be of different sizes and positions depending on the content of an image in this case.

By another option some blocks may be entropy blocks corresponding to non-entropy blocks, and other entropy blocks may not have any correspondence and are formed only for entropy coding. This may occur when the non-entropy block data is incomplete or was not used on certain areas of a frame, such as when a skip occurs for a slice of a frame for example so that no prediction and no transform data is generated, Optionally, process 1900 may include "identify blocks of frame to be entropy decoded using a spatial probability context model" 1908. This operation may be included when less than all entropy blocks on a frame are to be entropy coded using the spatial neighbor probability context model. Some entropy blocks may be entropy coded using different types of models for example.

Process 1900 may include "determine which entropy processing order to use" 1910, and this may include determining whether raster order or non-raster order is to be used on an entire frame or part of a frame without using entropy blocks, or within all entropy blocks or within only certain entropy blocks of a frame when the entropy blocks are defined.

There are conventional arithmetic coding schemes in which using the non-raster order has no impact on coding efficiency compared to using the raster order because in these systems, the arithmetic coding of the data is not sensitive to the order in which the data are encoded and depend only on the probability context, which is the same for both orders. Such non-sensitive algorithms process data that has no similarity or correlation between samples in raster scan order. In such cases, the non-raster order should be selected because it improves the decoder throughput.

However, there are other conventional arithmetic coding schemes in which using the non-raster order does have an impact on coding efficiency compared to using the raster order such as when the arithmetic coding of the data is sensitive to the order in which data are encoded. These sensitive algorithms process data that has similarity or correlation between samples in raster scan order. In this case, the encoder should decide whether and how to trade off coding efficiency versus decoder throughput. If the performance of the video application requires the decoder to hit a very high throughput, then the encoder should select the non-raster order. This balance is similar to that described above to select the placement and dimensions of entropy blocks when such blocks are provided.

It should be noted that both encoder and decoder should use the same order since the order may affect the syntax of the bit-stream. For both to use the same, either extra information, which may be in metadata or as part of the overhead of certain image data fields, such as in the network abstraction layer (NAL), and is sent as part of the bit-stream to indicate to the decoder which order has been used by the encoder, or the order is selected by the video standard, and both decoder and encoder that implement such video standard use the same order.

Process 1900 may include "perform decoding in parallel in a non-raster order to perform arithmetic entropy decoding" 1912. Here, the entropy coding is performed on those identified entropy blocks when present and for those blocks to receive such entropy coding treatment, or may be applied to the entire frame, or portions of the frame, on a per pixel basis when the non-raster entropy coding is to be applied without such entropy blocks or externally to such entropy blocks. Thus, the probability context is applied to entropy encode or decode the blocks, and the resulting compressed data is then provided for bitstream packing. It will be appreciated that while this operation mentions decoding, it equally applies to encoding as well.

Also to perform the non-raster order entropy coding, this operation may include "decode pixel location on a next row once the probability context of next row pixel location is available" 1914, and whether or not the decoding of all the pixel locations on the upper row above the next row is complete. When the entropy coding is performed on a per-pixel, frame wide basis, the entropy coding of multiple current pixel locations can occur on multiple frame rows all at the same time, without waiting for the above row to have all of its pixel locations entropy coded first. Thus, a pixel location can be entropy coded as soon as the spatial neighbor probability context for a current pixel location is established. Again, Ii will be appreciated that while this operation mentions decoding, it equally applies to encoding as well.

When entropy blocks are defined, optionally, process 1900 may include "perform the non-raster order decoding in each of multiple identified blocks" 1916. This results in multiple levels of parallelism. In a first parallel arrangement, more than one entropy block may be entropy coded at the same time. This may result in multiple current pixel locations on the same frame row being entropy coded at the same time where each of the current pixel locations on the same row are in a different entropy block. In a second parallel arrangement, multiple pixel locations at different rows may be entropy coded at the same time within the same single entropy block while the blocks are being processed in parallel as mentioned. This significantly reduces the latency caused by entropy coding where the limitations to the delay are determined by the processor and memory capacity for example and as discussed herein.

Referring to FIG. 20-23, in another approach, per pixel prediction syntaxes may be presented for a number of prediction blocks, here four prediction blocks (2002) PB 0 to 3 of a prediction block configuration 2000 are shown, and that form the image data of the decoded frames of the decoding loop of an encoder for example. The prediction blocks may be 4×4 pixels to 64×46 pixels, or other sizes, as determined by the coding standard being used. Also, the prediction blocks 2002 (PB0 to PB4) may include syntax elements that are used to compute the prediction chroma and luma data at the decoder side. Also as shown, residual syntaxes RB0 to RB3 of transform coefficients are formed in transform blocks 2102 in a transform block configuration 2100 and at the small block level (e.g. four transform blocks). Thus, each transform block (RB0 to RB3) may be 4×4 pixels but could be larger as well. By conventional bitpacking scheme 2200, the conventional way of bit packing packs all of the per pixel prediction syntaxes for all of the blocks before the residual syntaxes now shown here as RS0 to RS3 respectively corresponding to the residual blocks RB0 to RB3.

Figure 23:
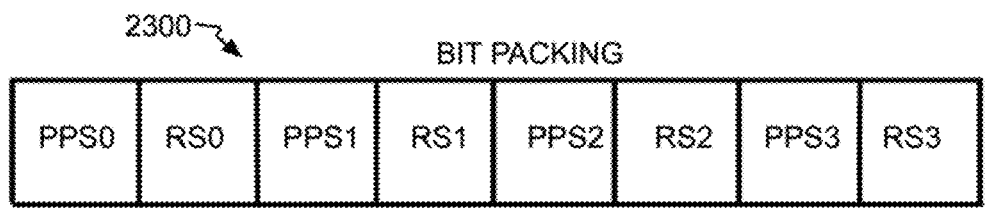
FIG. 23 is a detailed flow chart of a method of high throughput arithmetic entropy coding for video coding according to the implementations herein.

Referring to FIG. 23 however, the per pixel prediction syntaxes may be interleaved with the residuals (i.e. transform coefficient syntaxes) shown here as the four residual syntax blocks RS0 to RS3. Per pixel syntax blocks shown here PPS0 to PPS3 correspond to the prediction syntax blocks PB0 to PB3.

With the interleave between the per pixel prediction syntax and residual syntax, it allows processing of the whole transform block immediately once the data is available for each transform block without any additional latency caused by waiting for extraction from the bitstream and retrieval from a large amount of extracted data. This also removes the need for intermediate buffers between the arithmetic codec and preceding or following processing stages, and increases the overall throughput.

As shown on interleaved bitpacking scheme 2300, with the interleave between the per pixel prediction syntax and residual syntax, the data for a single transcoding block is kept together with the prediction syntax that will be used to adjust the residuals of the transcoding block. Thus, PPS0 comes right before RS0, PPS1 comes right before RS1, etc., forming an alternating pattern prediction and transforming blocks formed of the pairs of prediction and transform blocks for the same area or block on the frame. This allows processing of the whole transform block by using the per-pixel prediction syntax data immediately with the residual data once the data is available for this transform block without any additional latency. This also removes the need for intermediate buffers between the arithmetic codec and preceding or following processing stages, and increases the overall throughput. The start and stop of each interleaved part may be set by bit size.

Figure 24:
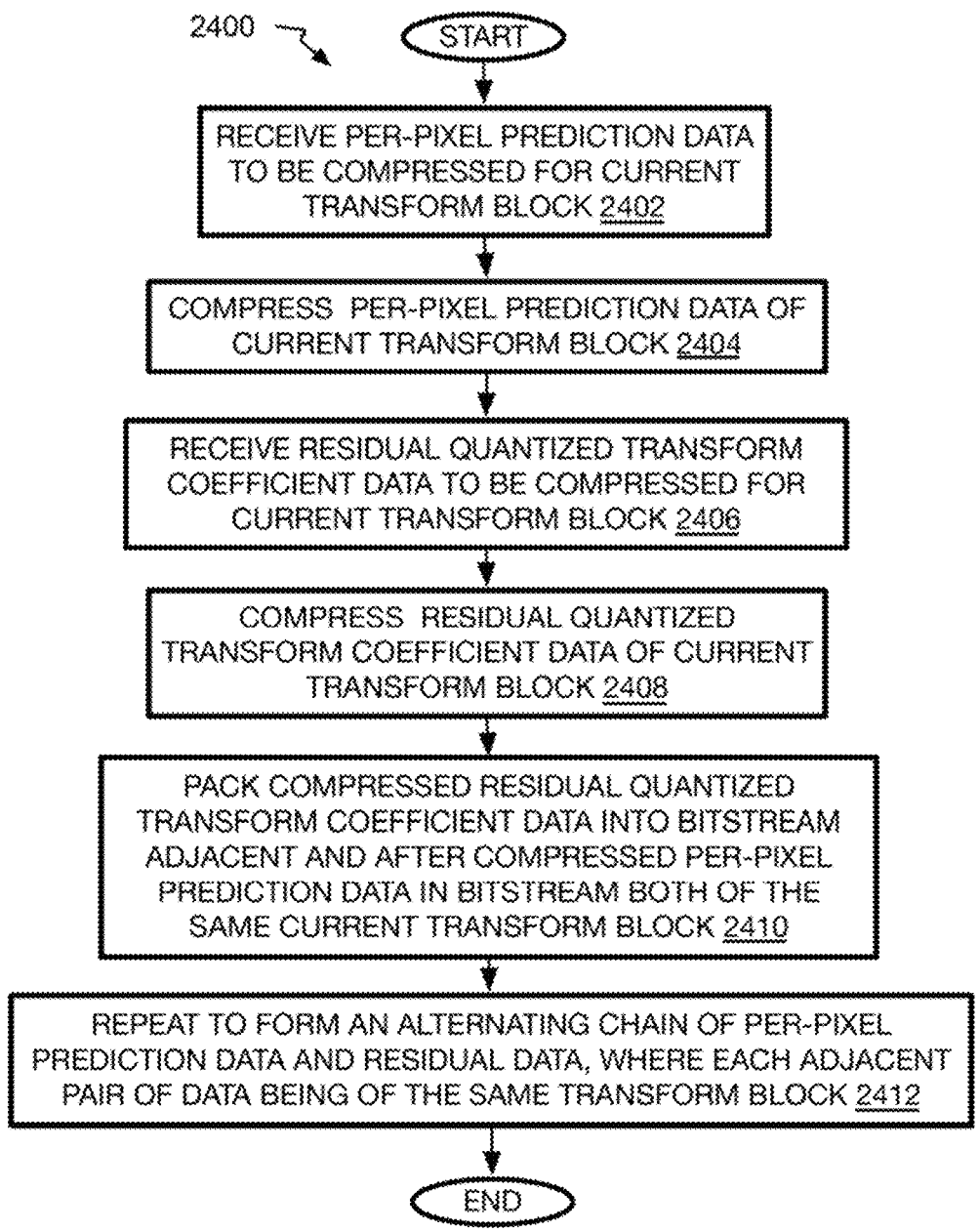
FIG. 24 is a detailed flow chart of another method of high throughput arithmetic entropy coding for video coding according to the implementations herein.

Referring to FIG. 24, an example process 2400 is arranged in accordance with at least some implementations of the present disclosure. In general, process 2400 may provide a computer-implemented method of high throughput arithmetic entropy coding for video coding, and particularly directed to the packing of the bitstream with alternating per-pixel prediction data and residual data. In the illustrated implementation, process 2400 may include one or more operations, functions or actions as illustrated by one or more of operations 2402 to 2412 generally numbered evenly. By way of non-limiting example, process 2400 may be described herein with reference to operations discussed with respect to FIGS. 1-5 and 7-22 herein and may be discussed below with regard to example systems 400, 500, 2800, 2900, or 2500.

Process 2400 may include "receive per-pixel prediction data to be compressed for current transform block" 2402. This may include syntax elements that are used to compute the prediction chroma and luma data at the decoder side.

Process 2400 may include "compress per-pixel prediction data of current transform block" 2404, and this refers to performing entropy coding or other lossless compression on the prediction data.

Process 2400 may include "receive residual quantized transform coefficient data to be compressed for current transform block" 2406, and this may include blocks of transform coefficients associated with residuals, and that are quantized to be in a lossy compressed state.

Process 2400 may include "compress residual quantized transform coefficient data of current of current transform block" 2408, which refers to compressing the quantized transform blocks into a lossless compressed state y entropy encoding or other lossless compression technique.

Process 2400 may include "pack compressed residual quantized transform coefficient data into bitstream adjacent and after compressed per-pixel prediction data in bitstream both of the same current transform block" 2410, and as explained above with bitpacking arrangement 2300, the compressed transform data may be packed into the bitstream next to the compressed per pixel prediction data of the same transform block.

Process 2400 may include "repeat to form an alternating chain of per-pixel prediction data and residual data, where each adjacent pair of data being of the same transform block" 2412. The bitstream packed in this way reduces latency by permitting processing of a whole transform block immediately once the data is available for each transform block and without the need for time consuming retrieval to match the data of the same transform block from a large amount of extracted data of many transform blocks, while reducing or eliminating the need for intermediate buffers to hold this data during the matching processes and between the arithmetic codec and preceding or following decoding stages. The result is an increase in the overall throughput.

While implementation of example process 600, 1900, and 2400, may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 25:
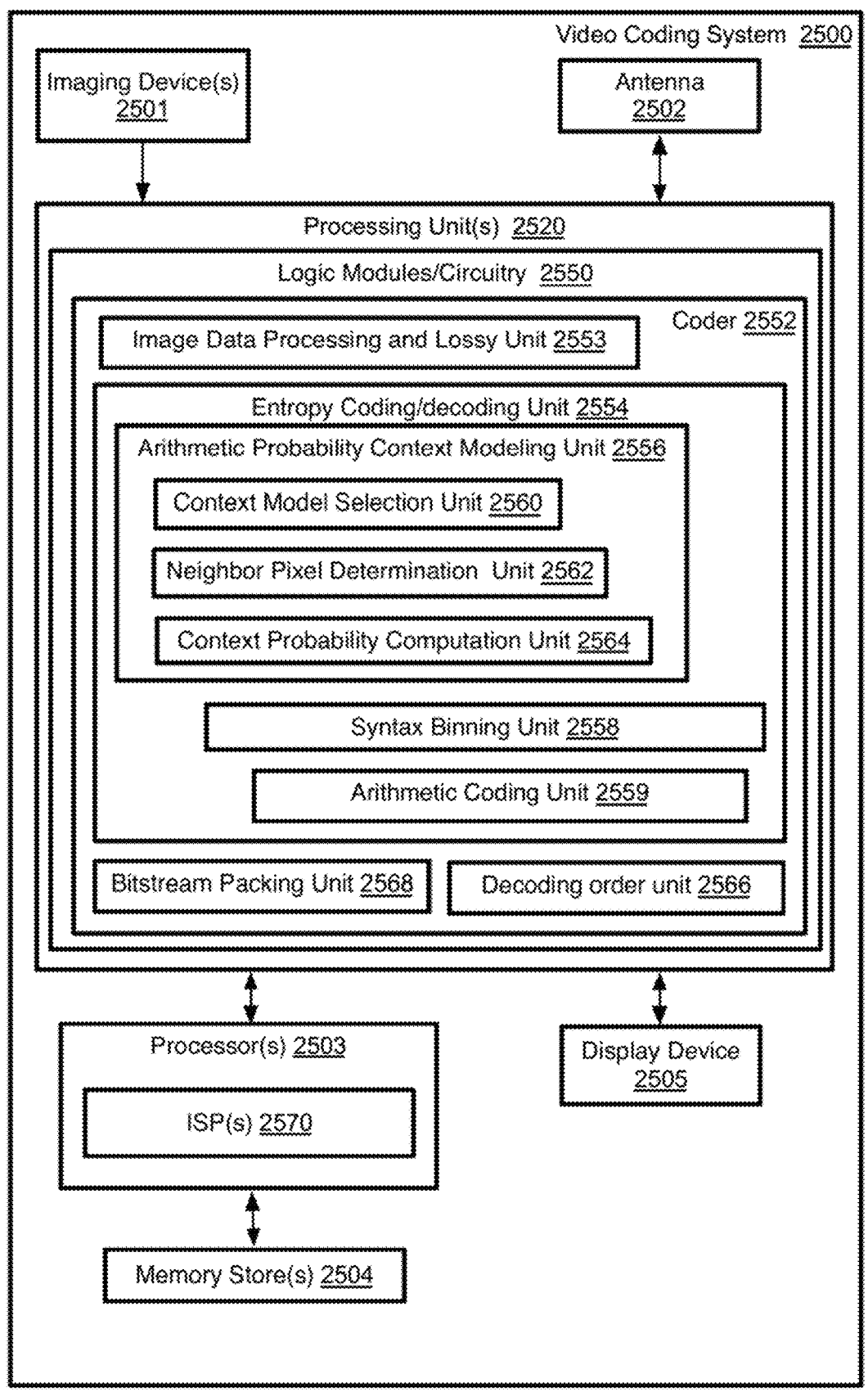
FIG. 25 is an illustrative diagram of an example system.

Referring to FIG. 25, an example image processing system (or video coding system) 2500 for providing high throughput arithmetic entropy coding for video coding may be arranged in accordance with at least some implementations of the present disclosure. In the illustrated implementation, system 2500 may include one or more processors 2503, processing unit(s) 2520 to provide the encoder and decoder discussed herein, one or more imaging devices 2501 to capture images, an antenna 2502 to receive or transmit image data, a display device 2505, and one or more memory stores 2504. Processor(s) 2503, memory store 2504, and/or display device 2505 may be capable of communication with one another, via, for example, a bus, wires, wireless transmission, or other access. In various implementations, display device 2505 may be integrated in system 2500 or implemented separately from system 2500.

As shown in FIG. 25, and discussed above, the processing unit(s) 2520 may have logic modules 2550 with a coder 2552 that could be encoder 400 or 2800, or decoder 500 or 2900, or some combination of these. Relevant here, the coder 2552 may have an image data processing and lossy unit 2553 that performs frame partitioning or reconstruction into blocks, transcoding and quantization if an encoder, a prediction loop for both decoder and encoder that performs inverse transcoding and quantization, filtering, intra-prediction, and inter-prediction, and where a number of these operations provide data to an entropy coding/decoding unit 2554 for further lossless compression on the encoder side, but where all data is received for decompression on the decoder side.

The entropy coding unit 2554 may have an arithmetic probability context modeling unit 2556 to provide the probability context model, a syntax binning unit 2558 that first receives syntax and assigns bins of the syntax to bits for compression or reconstructs the syntaxes from the bits during decompression, and an arithmetic coding unit 2559 to perform the compression or decompression. The arithmetic probability context modeling unit 2556 has a context model selection unit 2560 that sets which context model is to be used under which circumstances when more than one context model is available, a neighbor pixel determination unit 2562 that determines which pixel locations are to be used for decoding (or encoding) a current pixel position, and a context probability computation unit 2564 that determines the probabilities. The arithmetic coding unit 2559 uses the probabilities to decompress or compress data using arithmetic coding.

A decoding order unit (or entropy coded order unit) 2566 may be provided for a decoder to determine what decoding order is to be used depending on the frame or block as described above, and/or for initiating a request for data from the correct pixel locations, also as described above. Such a unit may be considered part of the entropy coding unit(s) described herein 502 or 2902, or could be a separate unit. Thus, such a decoding order unit 2566 may be part of decoder 500 or 2900, but could also be used for encoding to determine compression order so that it is part of encoder 400 at the encoder control 416 or entropy encoder 414, or may be considered a separate unit. This is similar to the encoder 2800 where the decoding order unit 2566 could be part of a control, entropy encoding unit 2808, or separate, or part of another unit.

Such an order unit 2566 also may perform the partitioning of the entropy coding blocks when other block partitioning is not to be used, or determining which blocks or areas of a frame are to use non-raster order versus raster order, and so forth for any of the blocks, or non-raster order assignments to be made herein. This may include determining any of the entropy block arrangement decisions mentioned above such as size, position, and/or shape of the entropy blocks as well as the number of blocks, as described above.

A bitstream packing unit 2568 packs data into packages placed into the bitstreams at an encoder and may be using the interleave scheme described above for the alternating packing of prediction data and transform data, as described above.

As will be appreciated, the modules illustrated in FIG. 25 may include a variety of software and/or hardware modules and/or modules that may be implemented via software or hardware or combinations thereof. For example, the modules may be implemented as software via processing units 2520 or the modules may be implemented via a dedicated hardware portion. Also, system 2500 may be implemented in a variety of ways. For example, system 2500 (excluding display device 2505) may be implemented as a single chip or device having an accelerator or a graphics processor unit (GPU) which may or may not have image signal processors (ISPs), a quad-core central processing unit, and/or a memory controller input/output (I/O) module. In other examples, system 2500 (again excluding display device 2505) may be implemented as a chipset or a system on a chip (SoC). It will be understood antenna 2502 could be used to receive image data for encoding as well.

Otherwise, processor(s) 2503 may include any suitable implementation including, for example, central processing units (CPUs), microprocessor(s), multicore processors, application specific integrated circuits, chip(s), chipsets, programmable logic devices, graphics cards, integrated graphics, general purpose graphics processing unit(s), fixed function GPUs, SoCs, other accelerators, or the like. This may also include or define a pipeline that has multiple parallel pipeline units that can each process a different large block. The implementation is not limited as long as kernels used to perform video coding prediction tasks can use software, firmware, and/or hardware to run on execution units that can call fixed function hardware such as VMEs and/or other parallel circuits that can perform the entropy coding in parallel and to efficiently perform repetitive computations such as for block-matching or spatial dependency calculations, or other tasks, and consistent with the description above. The VMEs or other parallel circuits may be in the form of a block (or portion) in the hardware whether dedicated or not for this purpose, and may have parallel circuits to entropy decompress or entropy compress pixel data from different rows of a picture separately and in parallel. This hardware may be placed in the graphics hardware, or could be a discrete GPU, such as at one or more ISPs 2570.

In addition, memory stores 2504 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 2504 also may be implemented via cache memory.

In various implementations, the example video coding system 2500 may use the imaging device 2501 to form or receive captured image data. This can be implemented in various ways. Thus, in one form, the image processing system 2500 may be one or more digital cameras or other image capture devices, and imaging device 2501, in this case, may be the camera hardware and camera sensor software, module, or component 2550. In other examples, video coding system 2500 may have the imaging device 2501 that includes or may be one or more cameras, and logic modules 2550 may communicate remotely with, or otherwise may be communicatively coupled to, the imaging device 2501 for further processing of the image data.

Thus, video coding system 2500 may be, or may be part of, or may be in communication with, a smartphone, tablet, laptop, or other mobile device such as wearables including smart glasses or virtual reality (VR) eye wear, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 2501 may include camera hardware and optics including one or more sensors as well as auto-focus, zoom, aperture, ND-filter, auto-exposure, flash, and actuator controls. The imaging device 2501 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 2501 may be provided with an eye tracking camera. Otherwise, the imaging device 2501 may be any other device that records, displays or processes digital images such as video game panels or consoles, set top boxes, and so forth.

As illustrated, any of these components may be capable of communication with one another and/or communication with portions of logic modules 2550 and/or imaging device 2501. Thus, processors 2503 may be communicatively coupled to both the image device 2501 and the logic modules 2550 for operating those components. Although image processing system 2500, as shown in FIG. 25, may include one particular set of blocks or actions associated with particular components or modules, these blocks or actions may be associated with different components or modules than the particular component or module illustrated here.

Figure 26:
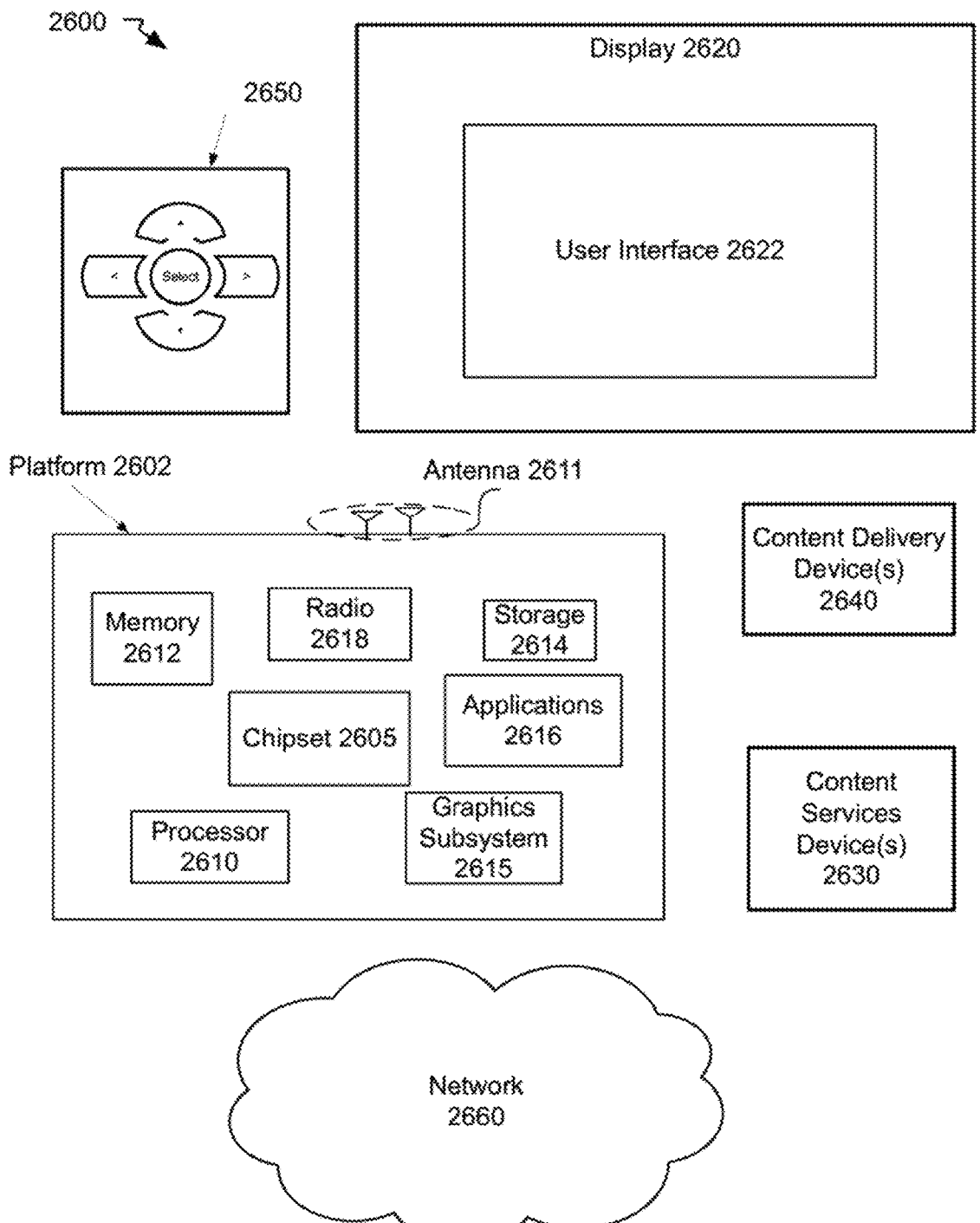
FIG. 26 is an illustrative diagram of another example system.

Referring to FIG. 26, an example system 2600 in accordance with the present disclosure and various implementations, including system 2500, may embody system 2600 for example, and may be a media system although system 2600 is not limited to this context. For example, system 2600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2600 includes a platform 2602 communicatively coupled to a display 2620. Platform 2602 may receive content from a content device such as content services device(s) 2630 or content delivery device(s) 2640 or other similar content sources. A navigation controller 2650 including one or more navigation features may be used to interact with, for example, platform 2602 and/or display 2620. Each of these components is described in greater detail below.

In various implementations, platform 2602 may include any combination of a chipset 2605, processor 2610, memory 2612, storage 2614, graphics subsystem 2615, applications 2616 and/or radio 2618 as well as antenna(s) 2611. Chipset 2605 may provide intercommunication among processor 2610, memory 2612, storage 2614, graphics subsystem 2615, applications 2616 and/or radio 2618. For example, chipset 2605 may include a storage adapter (not depicted) capable of providing intercommunication with storage 2614.

Processor 2610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2610 may be dual-core processor(s), dual-core mobile processor(s), and so forth.

Memory 2612 may be implemented as a volatile memory device such as, but not limited to, a Random Access Memory (RAM), Dynamic Random Access Memory (DRAM), or Static RAM (SRAM).

Storage 2614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2614 may include technology to increase the storage performance enhanced protection for valuable digital media when multiple hard drives are included, for example.

Graphics subsystem 2615 may perform processing of images such as still or video for display. Graphics subsystem 2615 may be a graphics processing unit (GPU) or a visual processing unit (VPU), for example. An analog or digital interface may be used to communicatively couple graphics subsystem 2615 and display 2620. For example, the interface may be any of a High-Definition Multimedia Interface, Display Port, wireless HDMI, and/or wireless HD compliant techniques. Graphics subsystem 2615 may be integrated into processor 2610 or chipset 2605. In some implementations, graphics subsystem 2615 may be a stand-alone card communicatively coupled to chipset 2605.

The graphics and/or video processing techniques described herein may be implemented in various hardware architectures including fixed function hardware such as video motion estimation (VME) engines or similar parallel processing circuits to perform entropy coding as well. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 2618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2618 may operate in accordance with one or more applicable standards in any version.

In various implementations, display 2620 may include any television type monitor or display. Display 2620 may include, for example, a computer display screen, touch screen display, video monitor, television-like device, and/or a television. Display 2620 may be digital and/or analog. In various implementations, display 2620 may be a holographic display. Also, display 2620 may be a transparent surface that may receive a visual projection. Such projections may convey various forms of information, images, and/or objects. For example, such projections may be a visual overlay for a mobile augmented reality (MAR) application. Under the control of one or more software applications 2616, platform 2602 may display user interface 2622 on display 2620.

In various implementations, content services device(s) 2630 may be hosted by any national, international and/or independent service and thus accessible to platform 2602 via the Internet, for example. Content services device(s) 2630 may be coupled to platform 2602 and/or to display 2620. Platform 2602 and/or content services device(s) 2630 may be coupled to a network 2660 to communicate (e.g., send and/or receive) media information to and from network 2660. Content delivery device(s) 2640 also may be coupled to platform 2602 and/or to display 2620.

In various implementations, content services device(s) 2630 may include a cable television box, personal computer, network, telephone, Internet enabled devices or appliance capable of delivering digital information and/or content, and any other similar device capable of unidirectionally or bidirectionally communicating content between content providers and platform 2602 and/display 2620, via network 2660 or directly. It will be appreciated that the content may be communicated unidirectionally and/or bidirectionally to and from any one of the components in system 2600 and a content provider via network 2660. Examples of content may include any media information including, for example, video, music, medical and gaming information, and so forth.

Content services device(s) 2630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2602 may receive control signals from navigation controller 2650 having one or more navigation features. The navigation features of controller 2650 may be used to interact with user interface 2622, for example. In implementations, navigation controller 2650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2650 may be replicated on a display (e.g., display 2620) by movements of a pointer, cursor, focus ring, or other visual indicators displayed on the display. For example, under the control of software applications 2616, the navigation features located on navigation controller 2650 may be mapped to virtual navigation features displayed on user interface 2622, for example. In implementations, controller 2650 may not be a separate component but may be integrated into platform 2602 and/or display 2620. The present disclosure, however, is not limited to the elements or in the context shown or described herein.

In various implementations, drivers (not shown) may include technology to enable users to instantly turn on and off platform 2602 like a television with the touch of a button after initial boot-up, when enabled, for example. Program logic may allow platform 2602 to stream content to media adaptors or other content services device(s) 2630 or content delivery device(s) 2640 even when the platform is turned "off." In addition, chipset 2605 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2600 may be integrated. For example, platform 2602 and content services device(s) 2630 may be integrated, or platform 2602 and content delivery device(s) 2640 may be integrated, or platform 2602, content services device(s) 2630, and content delivery device(s) 2640 may be integrated, for example. In various implementations, platform 2602 and display 2620 may be an integrated unit. Display 2620 and content service device(s) 2630 may be integrated, or display 2620 and content delivery device(s) 2640 may be integrated, for example. These examples are not meant to limit the present disclosure.

In various implementations, system 2600 may be implemented as a wireless system, a wired system, or a combination of both. When implemented as a wireless system, system 2600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 26.

Figure 27:
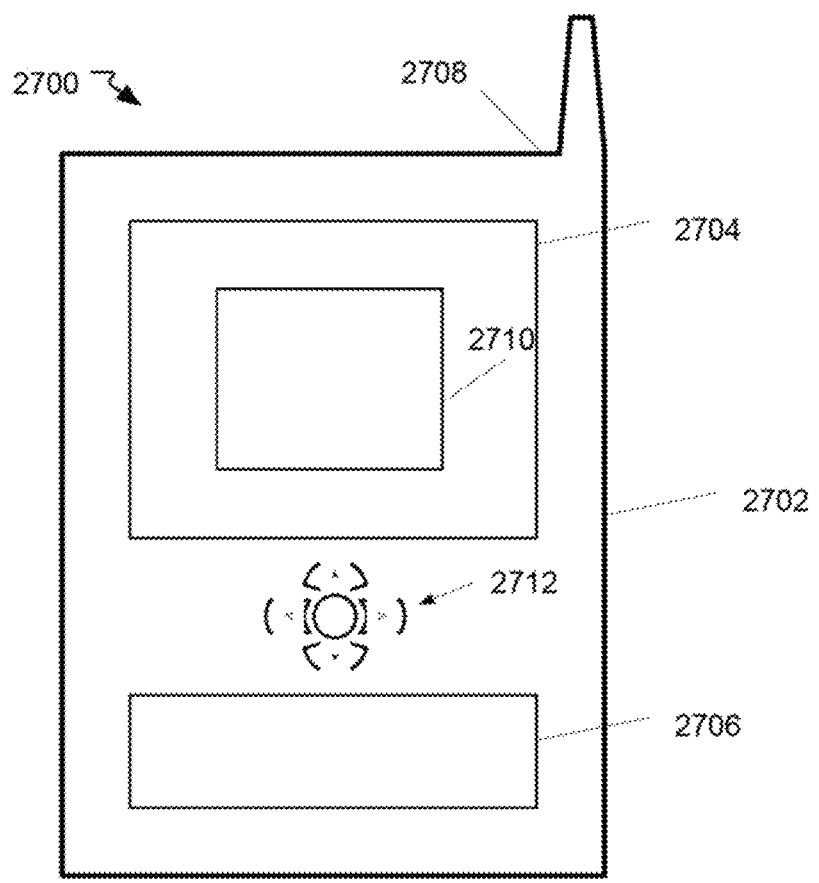
FIG. 27 illustrates another example device, all arranged in accordance with at least some implementations of the present disclosure.

As described above, system 2500 or 2600 may be implemented in varying physical styles or form factors. FIG. 27 illustrates implementations of a small form factor device 2700 in which system 2500 or 2600 may be implemented. In implementations, for example, device 1700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 27, device 2700 may include a housing 2702, a display 2704, an input/output (I/O) device 2706, and an antenna 2708. Device 2700 also may include navigation features 2712. Display 2704 may include any suitable screen 2710 on a display unit for displaying information appropriate for a mobile computing device. I/O device 2706 may include any suitable I/O device for entering information into a mobile computing device. Examples for I/O device 2706 may include an alphanumeric keyboard, a numeric keypad, a touch pad, input keys, buttons, switches, rocker switches, microphones, speakers, voice recognition device and software, and so forth. Information also may be entered into device 2700 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A method of video coding comprises obtaining a plurality of frames of a video sequence, wherein individual frames are formed of data from rows of pixels. The method also includes determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame; and using the spatial neighbor probability context to perform arithmetic entropy encoding or decoding of the data of the current pixel location.

The method also may comprise performing the entropy coding of multiple current pixel locations in parallel on multiple different rows of the same frame; entropy coding multiple current pixel locations simultaneously at different locations along the same frame row; performing the order to entropy code on part of a frame and a raster order to entropy code on another part of the same frame; dividing the at least one frame into entropy blocks each of a plurality of pixels that is less than the entire frame; and entropy coding one or more current pixel locations in individual entropy blocks in parallel to the coding of current pixel locations in other entropy blocks; limiting the data used to generate the spatial neighbor probability context of the current pixel location to within the same entropy block that holds the current pixel location; entropy coding current pixel locations forming an edge of an entropy block comprising using fewer spatial neighbor probability blocks than current pixel locations within the entropy block and away from the edge; wherein at least one of: (1) the entropy blocks are formed with a shape, size, position, or combination of these regardless of the shape, size, and position of other blocks used for non-entropy tasks while encoding or decoding pixel data of the at least one frame, and (2) wherein the entropy blocks are the same shape, position and size as non-entropy blocks used to encode or decode pixel data of the at least one frame; wherein less than all of the at least one frame is divided into entropy blocks; wherein a block-level raster order entropy coding is performed at individual entropy blocks; wherein block-level raster order entropy coding is performed at less than all entropy blocks; and using per-pixel prediction data packed in a bitstream package adjacent transform coefficient data of the same block to form an alternating pattern of prediction data and transform data paired for the same block and along the bitstream package.

A system of video coding may comprise at least one memory to store a plurality of frames of a video sequence, wherein individual frames are formed of data from rows of pixels; at least one processor communicatively connected to the at least one memory; and at least one entropy coding unit operated by the at least one processor and operated by: determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame; and using the spatial neighbor probability context to perform arithmetic entropy encoding or decoding of the data of the current pixel location.

The system of video coding also may comprise wherein the entropy coding unit is to operate by performing the entropy coding of multiple current pixel locations in parallel on multiple different rows of the same frame; wherein the entropy coding unit is to operate by performing the order to entropy code on a part of the frame and raster-order entropy coding on another part of the same frame; wherein the at least one frame is divided into entropy blocks each of a plurality of pixels that is less than the entire frame; and wherein the entropy coding unit is to operate by entropy coding one or more current pixel locations in individual entropy blocks in parallel to the coding of current pixel locations in other entropy blocks; wherein the entropy blocks have a variety of sizes on a single frame; wherein the individual entropy blocks are limited to the use of the spatial neighbor probability data within its own entropy block to perform the entropy coding; wherein the entropy blocks are formed with a shape, size, position, or combination of these regardless of the shape, size, and position of other blocks used for non-entropy tasks while encoding or decoding pixel data of the at least one frame; wherein less than all of the at least one frame is divided into entropy blocks; wherein the entropy coding unit is to operate by performing a block-level raster order entropy coding at at least some of the individual entropy blocks; wherein to entropy code is to entropy encode, and the entropy coding unit to operate by packing per-pixel prediction data into a bitstream package and adjacent transform coefficient data of the same block to form an alternating pattern of prediction data and transform data paired for the same block and along the bitstream package.

At least one non-transitory article having a computer-readable medium comprising instructions that cause a computing device to operate by At least one non-transitory article having a computer-readable media comprising instructions that cause a computing device to operate by: obtaining a plurality of frames of a video sequence, wherein individual frames are formed of data from rows of pixels; determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame; dividing the frames into blocks of a plurality of pixels that is less than the entire frame; and entropy coding multiple current pixel locations in individual blocks in parallel to other blocks and while entropy coding multiple pixel locations in parallel within the same block, wherein each block is limited to the use of the data within its own block to perform the entropy coding; and using the spatial neighbor probability context to perform arithmetic entropy encoding or decoding of the data of the current pixel location.

The instructions also may cause the computing device to operate by wherein to entropy code is to entropy decode, and the instructions cause the computing device to operate by obtaining per-pixel prediction data from a received bitstream and adjacent transform coefficient data of the same block to form an alternating pattern of prediction data and transform data paired for the same block and along the bitstream.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A method of video coding comprising:
obtaining a plurality of frames of a video sequence, wherein individual frames are formed of data from rows of pixels;
determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame;
using the spatial neighbor probability context to perform arithmetic entropy encoding or decoding of the data of the current pixel location; and
using per-pixel prediction data packed in a bitstream package adjacent transform coefficient data of the same block to form an alternating pattern of prediction data and transform data paired for the same block and along the bitstream package.

2. The method of claim 1 comprising performing the entropy coding of multiple current pixel locations in parallel on multiple different rows of the same frame.

3. The method of claim 2 comprising entropy coding multiple current pixel locations simultaneously at different locations along the same frame row.

4. The method of claim 1 comprising performing the order to entropy code on part of a frame and a raster order to entropy code on another part of the same frame.

5. The method of claim 1 comprising dividing the at least one frame into entropy blocks each of a plurality of pixels that is less than the entire frame; and
entropy coding one or more current pixel locations in individual entropy blocks in parallel to the coding of current pixel locations in other entropy blocks.

6. The method of claim 5 comprising limiting the data used to generate the spatial neighbor probability context of the current pixel location to within the same entropy block that holds the current pixel location.

7. The method of claim 6 comprising entropy coding current pixel locations forming an edge of an entropy block comprising using fewer spatial neighbor probability blocks than current pixel locations within the entropy block and away from the edge.

8. The method of claim 5 wherein the entropy blocks are formed with a shape, size, position, or combination of these regardless of the shape, size, and position of other blocks used for non-entropy tasks while encoding or decoding pixel data of the at least one frame.

9. The method of claim 5 wherein the entropy blocks are the same shape, position and size as non-entropy blocks used to encode or decode pixel data of the at least one frame.

10. The method of claim 5 wherein less than all of the at least one frame is divided into entropy blocks.

11. The method of claim 5 wherein a block-level raster order entropy coding is performed at individual entropy blocks.

12. The method of claim 5 wherein block-level raster order entropy coding is performed at less than all entropy blocks.

13. A computer-implemented system of video coding comprising:
at least one memory to store a plurality of frames of a video sequence, wherein individual frames are formed of data from rows of pixels;
at least one processor communicatively connected to the at least one memory and arranged to operate by:
determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame; and using the spatial neighbor probability context to perform arithmetic entropy encoding or decoding of the data of the current pixel location;

wherein to entropy code is to entropy encode, and the at least one processor to operate by packing per-pixel prediction data into a bitstream package and adjacent transform coefficient data of the same block to form an alternating pattern of prediction data and transform data paired for the same block and along the bitstream package.

14. The system of claim 13 wherein the at least one processor is to operate by performing the entropy coding of multiple current pixel locations in parallel on multiple different rows of the same frame.

15. The system of claim 13 wherein the at least one processor is to operate by performing the order to entropy code on a part of the frame and raster-order entropy coding on another part of the same frame.

16. The system of claim 13 wherein the at least one frame is divided into entropy blocks each of a plurality of pixels that is less than the entire frame; and wherein the at least one processor is to operate by entropy coding one or more current pixel locations in individual entropy blocks in parallel to the coding of current pixel locations in other entropy blocks.

17. The system of claim 16 wherein the entropy blocks have a variety of sizes on a single frame.

18. The system of claim 16 wherein the individual entropy blocks are limited to the use of the spatial neighbor probability data within its own entropy block to perform the entropy coding.

19. The system of claim 16 wherein the entropy blocks are formed with a shape, size, position, or combination of these regardless of the shape, size, and position of other blocks used for non-entropy tasks while encoding or decoding pixel data of the at least one frame.

20. The system of claim 16 wherein less than all of the at least one frame is divided into entropy blocks.

21. The system of claim 16 wherein the at least one processor is to operate by performing a block-level raster order entropy coding at at least some of the individual entropy blocks.

22. At least one non-transitory article having a computer-readable media comprising instructions that cause a computing device to operate by:

obtaining a plurality of frames of a video sequence, wherein individual frames are formed of data from rows of pixels;

determining a spatial neighbor probability context to be used to arithmetically entropy code data of a current pixel location on at least one of the frames and comprising entropy coding spatial neighbor pixels in an order to entropy code the data of the current pixel location before entropy coding substantially all or all of the pixel locations in a row of pixels above and adjacent to the row of pixels having the current pixel location, wherein the rows extend across an entire image forming the frame;

dividing the frames into blocks of a plurality of pixels that is less than the entire frame; and entropy coding multiple current pixel locations in individual blocks in parallel to other blocks and while entropy coding multiple pixel locations in parallel within the same block, wherein each block is limited to the use of the data within its own block to perform the entropy coding; and using the spatial neighbor probability context to perform arithmetic entropy encoding or decoding of the data of the current pixel location;

wherein to entropy code is to entropy decode, and the instructions cause the computing device to operate by obtaining per-pixel prediction data from a received bitstream and adjacent transform coefficient data of the same block to form an alternating pattern of prediction data and transform data paired for the same block and along the bitstream.

* * * * *